United States Patent
Chien et al.

(10) Patent No.: US 12,517,194 B2
(45) Date of Patent: Jan. 6, 2026

(54) MAGNET CONFIGURATION SYSTEMS AND METHODS TO DETECT MAGNETIC TUNNEL JUNCTION COERCIVITY WEAK BITS IN MRAM CHIPS

(71) Applicant: Taiwan Semiconductor Manufacturing Company Limited, Hsinchu (TW)

(72) Inventors: Cheng-Wei Chien, Hsinchu (TW); Harry-Hak-Lay Chuang, Zhubei (TW); Kuei-Hung Shen, Hsinchu (TW); Kuo-Feng Huang, Hsinchu (TW); Bo-Hung Lin, Kaohsiung (TW); Chun-Chi Chen, Hsinchu (TW)

(73) Assignee: Taiwan Semiconductor Manufacturing Company Limited, Hsinchu (TW)

( * ) Notice: Subject to any disclaimer, the term of this patent is extended or adjusted under 35 U.S.C. 154(b) by 1068 days.

(21) Appl. No.: 17/470,545

(22) Filed: Sep. 9, 2021

(65) Prior Publication Data

US 2022/0291306 A1      Sep. 15, 2022

Related U.S. Application Data

(60) Provisional application No. 63/159,672, filed on Mar. 11, 2021.

(51) Int. Cl.
  *G01R 33/09*   (2006.01)
  *G11C 11/16*   (2006.01)
  (Continued)

(52) U.S. Cl.
  CPC .......... *G01R 33/098* (2013.01); *G11C 11/161* (2013.01); *G11C 29/006* (2013.01);
  (Continued)

(58) Field of Classification Search
  CPC ......... H01L 21/68707; H01L 21/67242; H01L 22/00
  See application file for complete search history.

(56) References Cited

U.S. PATENT DOCUMENTS 5,350,926 A * 9/1994 White ................. H01J 37/3171
                                                   250/398
6,522,577 B1 * 2/2003 Earl ......................... G11C 11/15
                                                   365/158

(Continued)

*Primary Examiner* — Huy Q Phan
*Assistant Examiner* — Temilade S Rhodes-Vivour
(74) *Attorney, Agent, or Firm* — The Marbury Law Group, PLLC

(57) ABSTRACT

Disclosed methods include placing a semiconductor wafer containing MRAM devices into a first magnetic field that has a magnitude sufficient to magnetically polarize MRAM bits and has a substantially uniform field strength and direction over the entire area of the wafer. The method further includes placing the wafer in a second magnetic field having an opposite field direction, a substantially uniform field strength and direction over the entire area of the wafer, and magnitude less than a design threshold for MRAM bit magnetization reversal. The method further includes determining a presence of malfunctioning MRAM bits by determining that such malfunctioning MRAM bits have a magnetic polarization that was reversed due to exposure to the second magnetic field. Malfunctioning MRAM bits may further be characterized by electrically reading data bits, or by using a chip probe to read one or more of voltage, current, resistances, etc., of the MRAM devices.

20 Claims, 14 Drawing Sheets

(51) Int. Cl.
*G11C 29/00* (2006.01)
*G11C 29/50* (2006.01)
*G11C 29/56* (2006.01)
*H10B 61/00* (2023.01)
*H10N 50/01* (2023.01)

(52) U.S. Cl.
CPC ............ *G11C 29/50* (2013.01); *H10B 61/00* (2023.02); *H10N 50/01* (2023.02); *G11C 11/1675* (2013.01); *G11C 29/56* (2013.01)

(56) References Cited

U.S. PATENT DOCUMENTS

| | | | |
|---|---|---|---|
| 2004/0201378 A1* | 10/2004 | Sugano | B82Y 35/00 324/226 |
| 2005/0001249 A1* | 1/2005 | Anthony | G11C 11/15 257/E27.005 |
| 2015/0214086 A1* | 7/2015 | Hofmeister | H02J 50/90 414/744.5 |
| 2019/0066820 A1* | 2/2019 | Wang | H10B 61/20 |

* cited by examiner

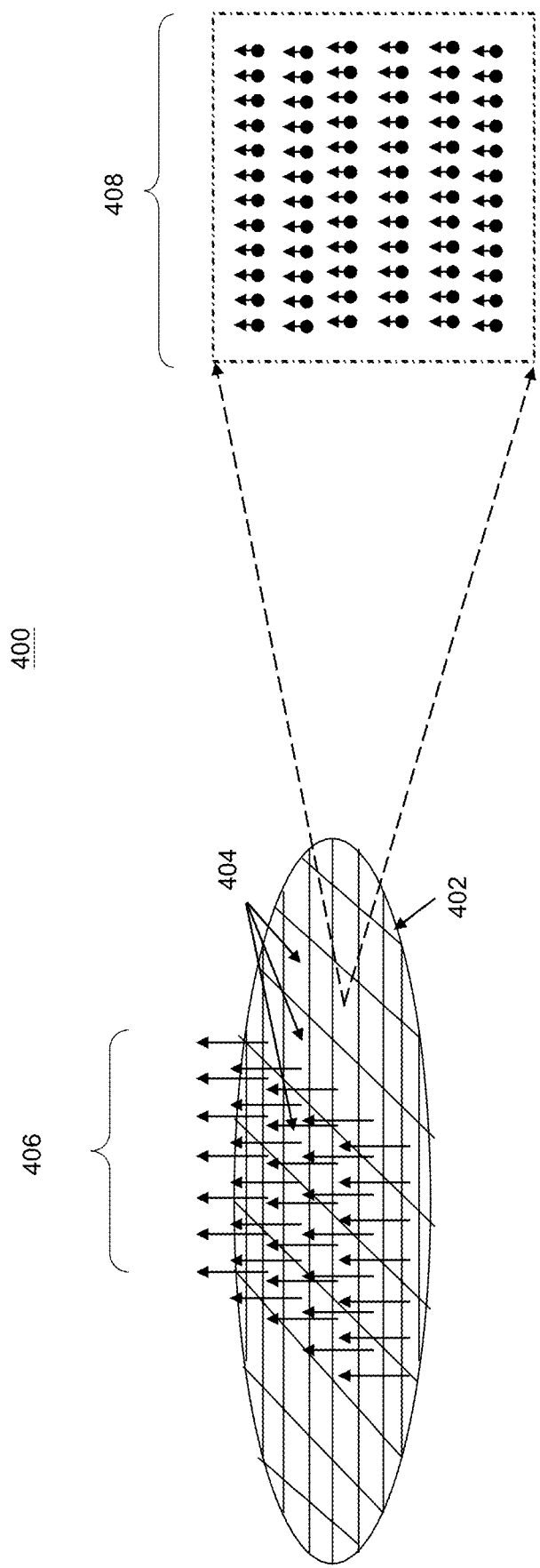

MAGNET CONFIGURATION SYSTEMS AND METHODS TO DETECT MAGNETIC TUNNEL JUNCTION COERCIVITY WEAK BITS IN MRAM CHIPS

RELATED APPLICATIONS

This application claims priority to U.S. Provisional Patent Application No. 63/159,672 entitled "Magnet configuration design for magnetic field aligned and MTJ coercivity weak bits detection in MRAM chip" filed on Mar. 11, 2021, the entire contents of which are hereby incorporated by reference for all purposes.

BRIEF DESCRIPTION OF THE DRAWINGS

Aspects of this disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 4A is a three-dimensional perspective view of a semiconductor wafer that has been exposed to a first large-area magnetic field source, according to various embodiments.

FIG. 4B illustrates uniform magnetic polarization of MRAM cells within a die on the wafer of FIG. 4A, according to various embodiments.

DETAILED DESCRIPTION

Figure 1:
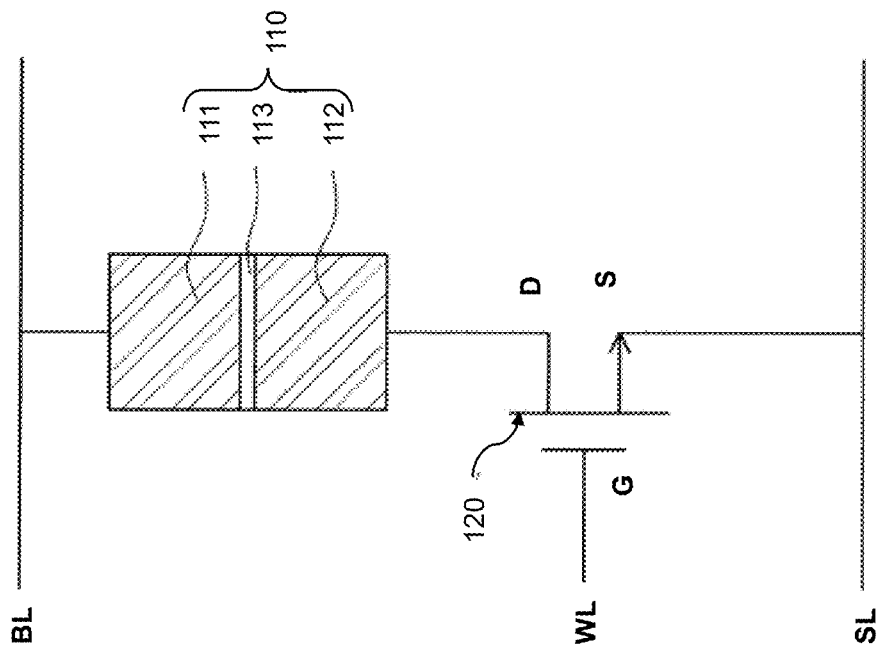
FIG. 1 is a schematic illustration of an magnetoresistive random access memory (MRAM) structure, according to various embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Unless explicitly stated otherwise, each element having the same reference numeral is presumed to have the same material composition and to have a thickness within a same thickness range.

Advances in integrated circuit (IC) manufacturing, and specifically semiconductor device manufacturing, are making many different types of memory devices available for use in logic chip designs. As examples, memory devices may include magnetoresistive random-access memory (MRAM) devices, resistive random-access memory (RRAM) devices, phase-change random-access memory (PCRAM) devices, etc. A magnetic tunnel junction (MTJ) device, used in MRAM, is a magnetoresistive device that has a switchable resistivity that depends on a relative orientation of magnetic polarization of two ferromagnetic materials. An MTJ device includes two layers of ferromagnetic materials separated by a thin insulating layer. By providing an insulating layer that is sufficiently thin (e.g., a few nanometers), electrons may tunnel from the first ferromagnetic layer through the insulating layer and into the second ferromagnetic layer. Magnetoresistance is the phenomena whereby the resistance to tunneling electrons depends on the relative orientation of the magnetization of the respective first and second ferromagnetic layers.

The relative orientation of magnetic polarization of the ferromagnetic layers may be controlled by the application of an external magnetic field. Alternatively, the relative polarization of the ferromagnetic layers may be controlled by application of an electric current. Thus, the resistance of the device may be switched from a low resistance to a high resistance by changing the relative orientation of the magnetization of the first and second ferromagnetic layers. In this way, an MTJ device may act as a memory device with a first value of resistance representing a "0" bit, and a second value of resistance representing a "1" bit. The MTJ device may be constructed such that the first ferromagnetic layer has a higher coercivity than the second ferromagnetic layer. As such, the orientation of the magnetization of the lower coercivity material may be switched with an applied magnetic field without switching the orientation of the magnetization of the higher coercivity material. This may be accomplished by designing the MTJ device such that a threshold for changing the lower coercivity material is sufficiently less than a threshold for changing the higher coercivity material.

The reliability of MRAM devices depends on a sufficiently large difference in the coercivities of the ferromagnetic layers in individual MTJ devices. Once manufactured, an MRAM device may be tested to ensure that coercivities of individual bits satisfy design constraints. The various embodiments disclosed herein provide improved systems and methods for testing MRAM devices.

FIG. 1 is a schematic illustration of an MRAM circuit 100, according to various embodiments. MRAM circuit 100 includes an MRAM cell 110 and a transistor 120. MRAM cell 110 may be a MTJ having ferromagnetic layers 111 and 112 separated by a thin insulating tunneling barrier 113. As described above, one of the ferromagnetic layers 111, 112 may be configured to have a higher coercivity than the other ferromagnetic layer. As such, the application of a suitably chosen magnetic field may change the orientation of the magnetization of one of the ferromagnetic layers 111, 112 while leaving the orientation of the magnetization of the other ferromagnetic layer unchanged. The resistivity of MRAM cell 110 may therefore be used to indicate a logical "0" or "1" state. The various embodiments disclosed herein are not intended, however, to be limited to any particular type of MRAM cell. The various embodiments disclosed herein may include various other types of magnetic memory cells. Digital information stored in MRAM cell 110 may be read by detecting the MRAM cell's 110 resistive state.

Transistor 120 may include a complementary metal oxide semiconductor (CMOS) device, a bipolar junction transistor (BJT), or other type of transistor. Transistor 120 may act as a selection transistor coupled in series with MRAM cell 110 in a single-cell MRAM design, as shown. In this example, MRAM cell 110 may be coupled at one end to the drain D of transistor 120. The other end of the MRAM cell 110 may be coupled to a bit-line (BL) of an MRAM array (array not shown). The source S of transistor 120 may be coupled to a select-line (SL) of the MRAM array, and the gate (G) of transistor 120 may be coupled to a word-line (WL) of the MRAM array. In other embodiments (not shown), MRAM cell 110 may be connected to the source S of the transistor 120, rather than to the drain D, and the drain D of transistor 120 may be connected to the select line SL.

Figure 2:
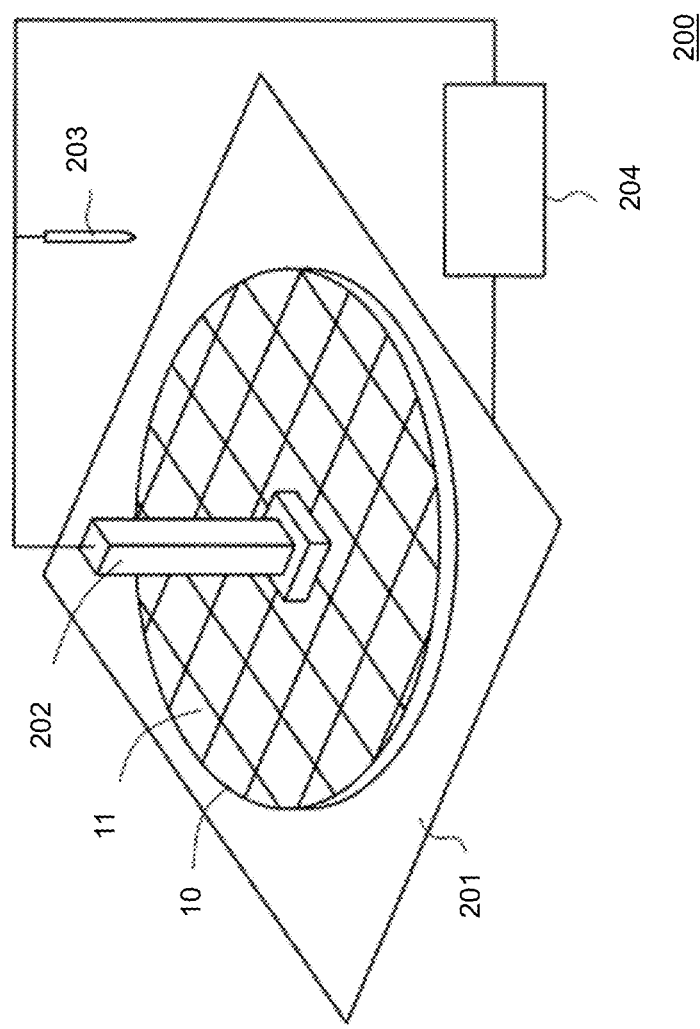
FIG. 2 is a three-dimensional perspective view of a test apparatus for detecting coercivity of MRAM bits, according to various embodiments.

FIG. 2 is a three-dimensional perspective view of a test apparatus 200, according to various embodiments disclosed herein. Test apparatus 200 includes a wafer fixture 201, a magnetic field generator 202, a chip probe 203, and a controller 204. Controller 204 may be communicatively coupled to a wafer fixture 201, to a magnetic field generator 202, and to a chip probe 203, and may be configured to control each of the wafer fixture 201, the magnetic field generator 202, and the chip probe 203. A wafer 10 may include a plurality of dies or chips 11. Each die or chip 11 formed on a wafer 10 may include a plurality of MRAM structures 100 (e.g., see FIG. 1) arranged in an array. The wafer fixture 201 may include a plate holding the wafer 10. The wafer fixture 201 may be positioned below magnetic field generator 202. The wafer fixture 201 may further include a driver (not shown), such as a motor, an actuator, etc., that is configured to move the plate (e.g., selectively in x, y and z directions) to thereby position the wafer 10 relative to magnetic field generator 202. In alternative embodiments, the wafer fixture 201 and wafer 10 may remain immobile while the magnetic field generator 202 may move about the wafer fixture 201 and wafer 10 to thereby position the magnetic field generator 202 relative to the wafer 10.

The magnetic field generator 202 may include an electromagnet that may be configured to generate a localized magnetic field in response to a current supplied to magnetic field generator 202. The magnitude of the magnetic field may vary based on design requirements, and may be controlled by controlling the current supplied to the electromagnet. Controller 204 may actuate the magnetic field generator 202 to generate a time dependent magnetic field. For example, the magnetic field generator 202 may be actuated to generate a pulsed magnetic field. The magnetic field generator 202 may be configured to emit a magnetic field pulse that may be oriented in a particular direction and/or has a limited spatial extent. For example, a portion of the electromagnet contained within the magnetic field generator 202 may be covered with a material (not shown) that shields the magnetic field to thereby generate localized magnetic fields in unshielded portions of the electromagnet. Alternatively, magnetic field generator 202 may include a permanent magnet, and a magnetic field strength experienced by a chip 11 on wafer 10 may be controlled by adjusting a distance between magnetic field generator 202 and the wafer 10.

The chip probe 203 may be configured to contact test pads (not shown) disposed on the wafer 10 in order to measure voltage, current, resistances, and other characteristics of dies or chips 11. The test pads may be disposed on dies or chips 11 or disposed on scribe lines between dies or chips 11. The controller 204 may include logic circuits (not shown) formed on an IC chip that may be configured to control wafer fixture 201, the magnetic field generator 202, and the chip probe 203. In some embodiments, controller 204 may include a processor circuit (not shown) that may be programmed to perform tests on MRAM cells disposed on wafer 10 in accordance with a chip probing (CP) test protocol, as follows.

A testing procedure may start by loading a wafer 10, including an array of MRAM cells, onto the wafer fixture 201. The wafer fixture 201 may then be positioned relative to magnetic field generator 202 (or vice versa). In this regard, the magnetic field generator 202 may be held fixed while the wafer fixture 201 may be moved to a location below magnet field generator 202. Alternatively, wafer fixture 201 may be held fixed while magnetic field generator 202 is moved relative to wafer fixture 201. In this alternative embodiment, magnetic field generator 202 may be attached to a motor which moves magnetic field generator 202 relative to wafer fixture 201.

Once the magnetic field generator 202 and the wafer fixture 201 are aligned (i.e., magnetic field generator 202 is aligned with a chip or die 11), the magnetic field generator 202 may apply a first magnetic field to initialize MRAM cells. In this regard, the first magnetic field may have a first direction relative to the MRAM cells and may have a magnitude (e.g., >1 T) that is sufficient to forcibly change a magnetic polarity of the free layer and to pin the free layer of the MRAM cells. This first magnetic field may thereby initialize the MRAM cells with a predetermined data pattern. For example, a test pattern of "1, 1, 1, 1, . . . " may be forcibly written to the MRAM cells by subjecting the MRAM cells to the first magnetic field.

The magnetic field generator 202 may then apply a second magnetic field to the MRAM cells disposed on the wafer 10. The second magnetic field may have a direction that is different (e.g., opposite) than that of the first magnetic field. The second magnetic field may have a magnitude that is less than a threshold magnitude that is required to change or reverse the magnetic polarization of MRAM bits. A magnetic field having the threshold magnitude may be referred to as a reversal magnetic field. The magnitude of the reversal magnetic field may be predetermined depending at least on the material and design of the MRAM structure.

In example testing embodiments, the magnitude of the first magnetic field may be chosen to be greater than the reversal magnetic field to thereby ensure that a test pattern may be written to the MRAM bits by application of the first magnetic field. The magnitude of the second magnetic field may be chosen to be smaller than the reversal magnetic field. As such, all properly functioning MRAM bits should not be altered by the second magnetic field, and any bits that are altered or reversed by the second magnetic field may be identified as potentially malfunctioning bits. In this way, MRAM cells may be tested to determine reliability of magnetic field immunity.

Chip probing (e.g., testing via chip probe 203) may be performed to read data from MRAM cells that have been subjected to the first and second magnetic fields. In this regard, the chip probe 203 may read electrical parameters, such as voltage, current, resistance, etc., of individual MRAM cells after the chip probe 203 is moved to a location that is in contact with test pads (not shown) disposed on the wafer 10. Controller 204 may then determine performance metrics of the MRAM cells based on the data read by the chip probe 203. For example, magnetic field immunity of the MRAM cells subjected to a magnetic field may be determined. In the above example, a test protocol was described that uses a single first magnetic field and a single second magnetic field. In other embodiments, a plurality of tests may be performed with one or more first magnetic fields and one or more second magnetic fields. For example, tests may be performed using fields having a plurality of magnitudes and directions.

Figure 3:
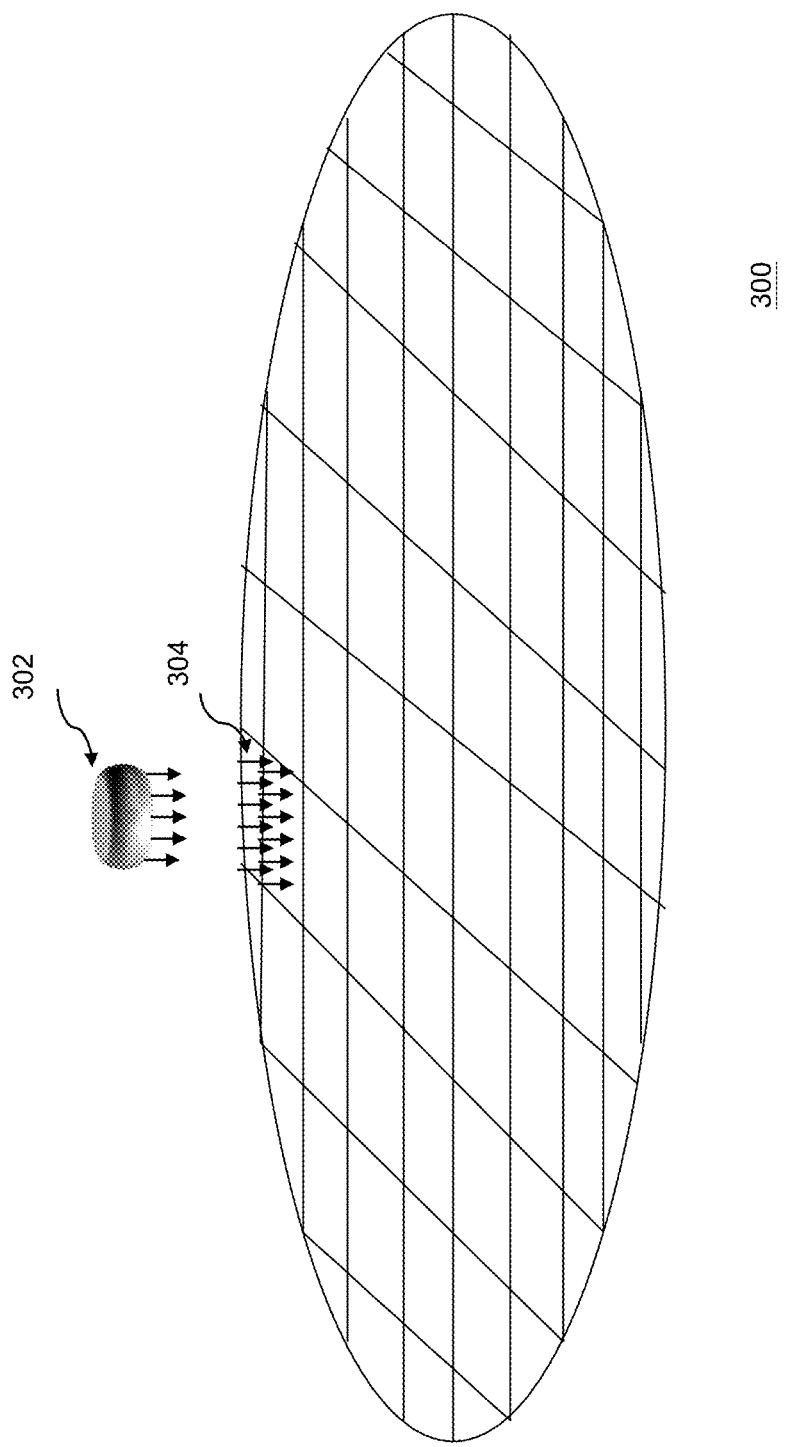
FIG. 3 is a three-dimensional perspective view of a localized magnetic field source that generates a magnetic polarization of a wafer die, according to various embodiments.

FIG. 3 is a three-dimensional perspective view 300 of a localized magnetic field source 302 that may generate a magnetic polarization 304 of a wafer die, according to various embodiments. Localized magnetic field source 302 may be a permanent magnet or may be an electromagnet. Such a localized magnetic field source 302 was described above with reference to FIG. 2. In this regard, localized magnetic field source 302 may be a component of magnetic field generator 202. The above-described CP protocol described a procedure for testing a single die or chip 11 of wafer 10 (e.g., see FIG. 2). Testing MRAM devices on an entire wafer (e.g., wafer 10 of FIG. 2) requires the test to be repeatedly performed for each die or chip 11 (hereinafter die 11). The process of applying the first and second magnetic fields to a die 11 to align the MRAM devices in that die 11 typically takes approximately 3 seconds and weak bit detection requires approximately 5 seconds per die. Thus, for a wafer having eighty (80) separate dies 11 formed thereon, the complete process has a throughput of less than six wafers per hour. Disclosed embodiments provide systems and methods to greatly increase the throughput of testing procedures, as described in the following.

FIG. 4A is a three-dimensional perspective view 400 of a wafer 402 that has been exposed to a first large-area magnetic field source (not shown), according to an embodiment. In this regard, a process of testing MRAM devices on a wafer 402 may be greatly accelerated by exposing the entire wafer 402, or a large area 406 of wafer 402, simultaneously to the first magnetic field. As such, all MRAM devices in a plurality of dies 404 may be magnetically aligned (i.e., polarized) at one time. As described below with reference to FIGS. 6, 8, and 10 to 13, systems and methods are disclosed that allow large areas (e.g., area 406 in FIG. 4A) of wafer 402 (or an entire wafer) to be exposed to the first and second magnetic fields. Such wafers may then be probed (e.g., using a chip probe 203 of FIG. 2) to determine reliability of MRAM cells, as described above.

FIG. 4B illustrates a uniform magnetic polarization of MRAM cells within a die 408, according to an embodiment. In this regard, wafer 402 has been exposed to the first magnetic field. The orientation of the arrows in FIG. 4B is merely meant to illustrate uniform polarization and is not intended to illustrate any particular direction relative to the surface of wafer 402. For example, the arrows in region 406 of FIG. 4A are shown pointing upwardly away from the surface of wafer 402. This direction of polarization is only one example polarization direction. In other embodiments, MRAM cells may be exposed to a first magnetic field that is aligned at a non-perpendicular angle relative to the surface of wafer 402. Alternatively, the MRAM cells may be polarized to have a direction of magnetic polarization that lies in a plane parallel to the surface of wafer 402. In any of these example polarization directions, the polarization indicated in die 408 of FIG. 4B corresponds to uniform polarization of the various bits (i.e., individual MRAM cells) of FIG. 4A. Application of the second magnetic field may then be used to determine potentially malfunctioning MRAM bits, as described in further detail with reference to FIGS. 5A and 5B, below.

Figures 5A, 5B:
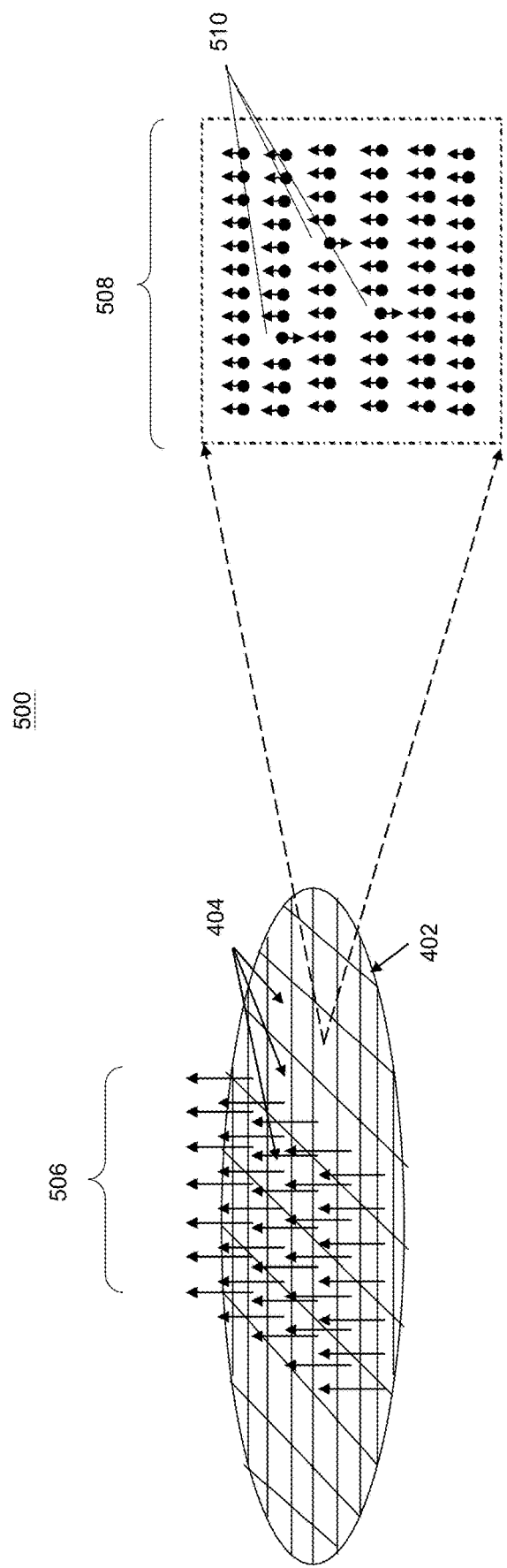
FIG. 5A is a three-dimensional perspective view of a semiconductor wafer that has been exposed to a second large-area magnetic field source, according to various embodiments.
FIG. 5B illustrates non-uniform magnetic polarization of MRAM cells within a die of the wafer of FIG. 5A, according to various embodiments.

FIG. 5A is a three-dimensional perspective view 500 of wafer 402 that has been exposed to a second large-area magnetic field source (not shown), according to an embodiment. As such, wafer 402 has large area 506, containing a plurality of dies 404, in which MRAM bits have been exposed to first and second magnetic fields. As described above with reference to FIG. 2, in the context of the CP protocol, the second magnetic field may have a direction and magnitude that are different than the first magnetic field. For example, the first magnetic field (resulting in the polarizations indicated in FIGS. 4A and 4B) may have a magnitude that is greater than the reversal magnetic field to thereby ensure that MRAM cells are uniformly polarized by the first magnetic field. In contrast, the second magnetic field may have a different (e.g., opposite) direction than that of the first magnetic field and may have a magnitude that is less than the reversal magnetic field. As such, all properly functioning MRAM bits should not be appreciably affected by the application of the second magnetic field.

FIG. 5B illustrates a non-uniform polarization of MRAM cells within a die 508, according to an embodiment. As shown, most of the bits have a magnetic polarization similar to the polarization indicated in FIG. 4B that was caused by application of the first magnetic field. Some of the bits 510, however, show a reversed polarization. Such bits 510, therefore, do not have sufficient coercivity to resist being altered by the second magnetic field. In this regard, bits 510 may be considered to be potentially malfunctioning since their coercivity is less than the design threshold to withstand reversal by the second magnetic field.

Once wafer 402 has been exposed to the first and second magnetic fields, malfunctioning bits 510 may be characterized using the chip probe 203 (e.g., testing via the chip probe 203 of FIG. 2), as described above. Alternatively, resistivity of individual MRAM devices (e.g., see FIG. 1) may be determined by reading individual data bits of MRAM devices 100. In this regard, application of the first magnetic field may act to program all of the data bits to have a first state (e.g., a "1" state). Application of the second magnetic field may have the effect of only altering (e.g., change a "1" state to a "0" state) malfunctioning bits. Thus, any bits detected to be in the second state (e.g., the "0") may be identified as potentially malfunctioning bits.

Figure 6:
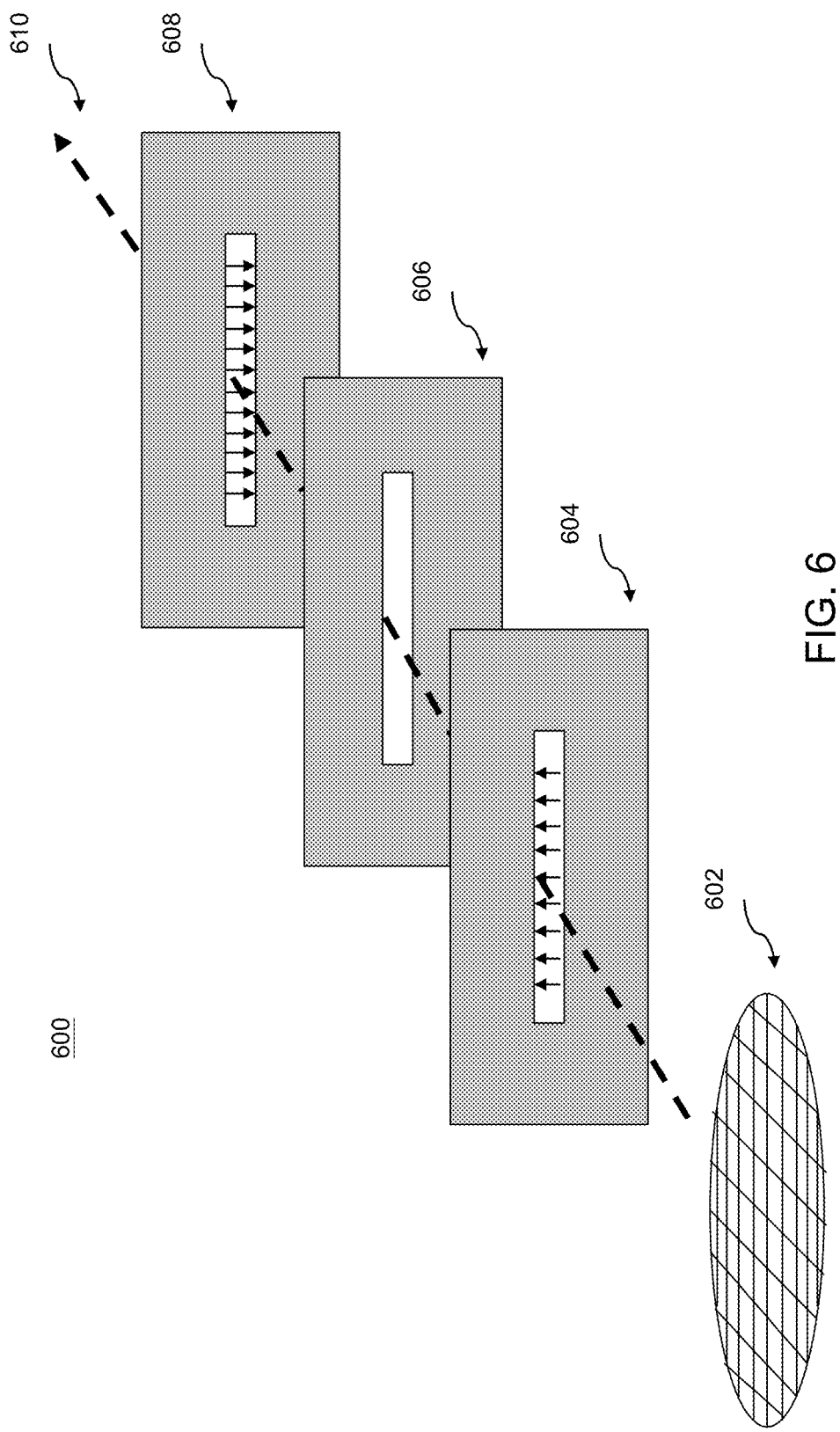
FIG. 6 illustrates components of a system configured to expose large areas of a wafer to magnetic fields and a path through the system that may be traversed to expose a wafer to magnetic fields, according to various embodiments.

FIG. 6 illustrates components of a system 600 configured to expose large areas of a wafer 602 to magnetic fields, according to an embodiment. System 600 includes a first magnet 604, a magnetic shielding structure 606, and a second magnet 608. Magnetic shielding structure 606 may be used to reduce overlap of fields produced by magnet 604 and magnet 608. As such, first magnet 604 and second magnet 608 may be placed closer together than would be possible without magnetic shielding material 606.

First magnet 604 and second magnet 608 may be permanent magnets or may be electromagnets. First magnet 604 may be configured to have a first magnetic field having a first magnitude and direction. In this example, first magnet 604 may have a first magnetic field oriented in an upward direction (e.g., see arrows in FIG. 6) and second magnet 608 may have a magnetic field oriented in a downward direction (e.g., see arrows in FIG. 6). First magnet 604 may have a first magnetic field strength that is greater than the reversal magnetic field and second magnet 608 may have a second magnetic field strength that is less than the reversal magnetic field. The first magnet 604 and second magnet 608 may be a bar magnet that a wafer 602 may be scanned by the bar magnet at a constant speed. In other embodiments, the first magnet 604 and second magnet 608 may be cylindrical with convex or trapezoidal column in shape such that whole MRAM chips on the wafer may be exposed to the magnetic at the same time. The applied uniform magnetic field area may be equal or larger than wafer 602.

First magnet 604, shielding material 606, and second magnet 608 may be configured to have openings that are larger than a diameter of wafer 602. As such, wafer 602 may be physically passed through first magnet 604, then through shielding material 606, and then through second magnet 608, as indicated by the path 610. When passing through magnet 604, wafer 602 may be exposed to the first magnetic field and when passing through magnet 608, wafer 602 may be exposed to the second magnetic field. The presence of shielding material 606 ensures that wafer 602 is primarily exposed to only a single magnetic field at a time.

First magnet 604, shielding material 606, and second magnet 608 have a width larger than a diameter of wafer 602, as shown. The length (i.e., physical dimension along path 610) of first magnet 604, shielding material 606, and second magnet 608 may be less than a diameter of wafer 602 such that only a portion of wafer 602 is exposed to a magnetic field at a time. In other embodiments, the length of first magnet 604, shielding material 606, and second magnet 608 may be comparable to, or greater than, a diameter of wafer 602 such that a large portion of wafer 602, or the entire wafer 602 may be exposed at the same time. The dimensions of first magnet 604, shielding material 606, and second magnet 608 are not drawn to scale in FIG. 6. In this regard, FIG. 6 indicates an embodiment in which the lengths of first magnet 604, shielding material 606, and second magnet 608 are relatively thin compared to a diameter of wafer 602. Other embodiments (not shown) may have lengths that are comparable to a portion of the wafer 602 diameter, comparable to the wafer 602 diameter, or greater than the wafer 602 diameter.

Figure 7:
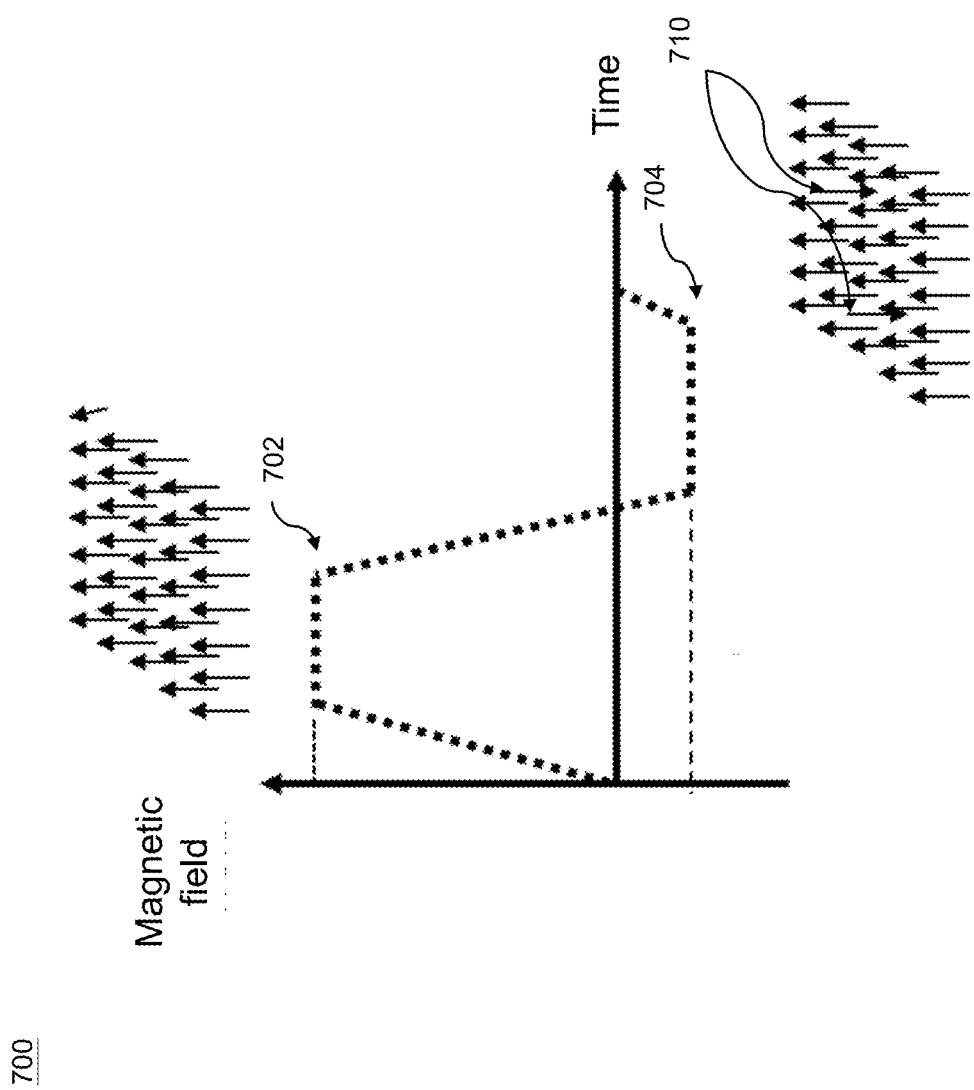
FIG. 7 illustrates a time dependent magnetic field experienced by a wafer moved through the system of FIG. 6 at a constant speed along the path indicated in FIG. 6, according to various embodiments.

FIG. 7 illustrates a time dependent magnetic field 700 experienced by wafer 602 as wafer 602 is moved through system 600 of FIG. 6 at a constant speed, according to an embodiment. As shown in FIG. 7, magnetic field 700 experienced by wafer 602 (e.g., see FIG. 6) ramps up from a zero value of magnetic field strength when wafer 602 is outside of first magnet 604 to a maximum value 702 of magnetic field strength within magnet 604. Magnetic field 700 shown in FIG. 7 may represent a field strength experienced by a point on wafer 602 (e.g., a point on the edge of wafer 602, at the center of wafer 602, etc.).

FIG. 7 indicates that a point on wafer 602 experiences maximum magnetic field strength 702 for a finite period of time corresponding to the horizontal width of the plateau 702 of magnetic field strength vs. time in FIG. 7. This finite period of time is related to the length of magnet 604. In this regard, the time during which a point on wafer 602 experiences a constant value 702 of magnetic field 700 is approximately given by the length of magnet 604 divided by the constant speed that wafer 602 moves through magnet 604. In other embodiments, wafer 602 may be moved through magnet 604 with a non-constant speed. For example, in embodiments in which the length of magnet 604 is greater than a diameter of wafer 602, it may be advantageous to move wafer 602 into magnet 604 and to hold wafer 602 in a stationary configuration within magnet 604 for a finite period of time before removing wafer 602 from magnet 604.

As described above, the effect of exposing wafer 602 to the first magnetic field generated by first magnet 604 is to align MRAM bits along the direction of the first magnetic field, as indicated by the aligned arrows above the graph in FIG. 7. Next, as wafer 602 is moved through shielding material 606 and then into magnet 608 magnetic field 700 experienced by a point on wafer 602 changes as shown in FIG. 7 from the first magnetic field strength 702 to the second magnetic field strength 704. The negative value of the second magnetic field strength 704 indicates that the second magnetic field points along a direction opposite to the direction of the first magnetic field. Also, as shown in FIG. 7, the magnitude of the second magnetic field 704 is less than the magnitude 702 of the first magnetic field.

As described above, the magnitude 702 of the first magnetic field may be chosen to be above a threshold for reversal of magnetic polarization of MRAM bits, while the magnitude 704 of the second magnetic field may be less than the threshold for reversal of magnetic polarization of MRAM bits. As such, properly functioning MRAM bits will be aligned by the first magnetic field 702 but should not be altered by the second magnetic field 704. Thus, as indicated by the arrows below the second magnetic field strength 704 in FIG. 7, most of the MRAM bits remain aligned after exposure to the second magnetic field strength 704 while a few bits (e.g., 710) have been reversed (e.g., as indicated by the downwardly pointing arrows in FIG. 7). As described above, the presence of such reversed bits may indicate damaged and/or malfunctioning MRAM bits. Further testing using chip probing (e.g., with probe 203 of FIG. 2) may be performed to characterize potentially malfunctioning bits. Alternatively, malfunctioning bits may be detected by reading MRAM data values after exposure to the second magnetic field.

Figure 8:
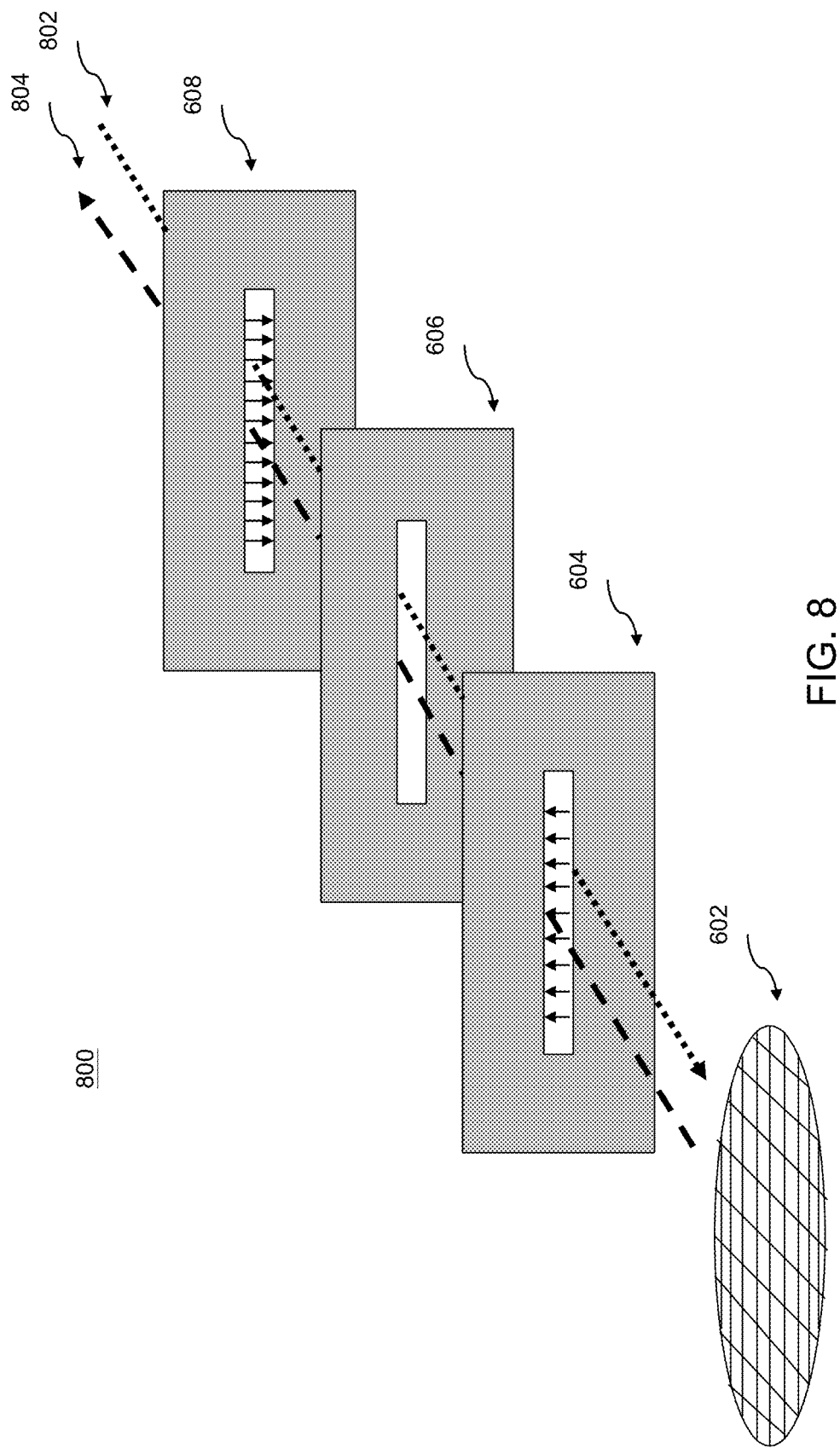
FIG. 8 illustrates a path through the system components of FIG. 6 that may be used to twice-expose a wafer to magnetic fields generated by the components of FIG. 6, according to various embodiments.

FIG. 8 illustrates a path, 802 and 804, through the system 800 that may include the components of FIG. 6 that may be used to twice-expose wafer 602 to magnetic fields generated by the components of FIG. 6, according to an embodiment. In this embodiment, wafer 602 may be passed through first magnet 604 and second magnet 608 and shielding material 606 twice in an "in and out" path. For example, wafer 602 may be moved through the system first along path 802. Along this first path 802, wafer 602 experiences the second magnetic field of the second magnet 608 followed by the first magnetic field of the first magnet 604. In a second pass, wafer 602 may be moved back in the other direction through the system along path 804. As such, wafer 602 may be exposed, once again, to the first magnetic field generated by the first magnet 604 followed by the second magnetic field generated by the second magnet 608. This process allows wafer 602 to enter and leave the system at the same point (e.g., in the upper right of FIG. 8). An embodiment system configured in a manner consistent with FIG. 8 may be advantageous in terms of having a reduced footprint in comparison to alternative embodiment system configurations in which wafer 602 enters the system at one point and leaves the system at another point, such as the embodiment system illustrating in FIG. 6.

Figure 9:
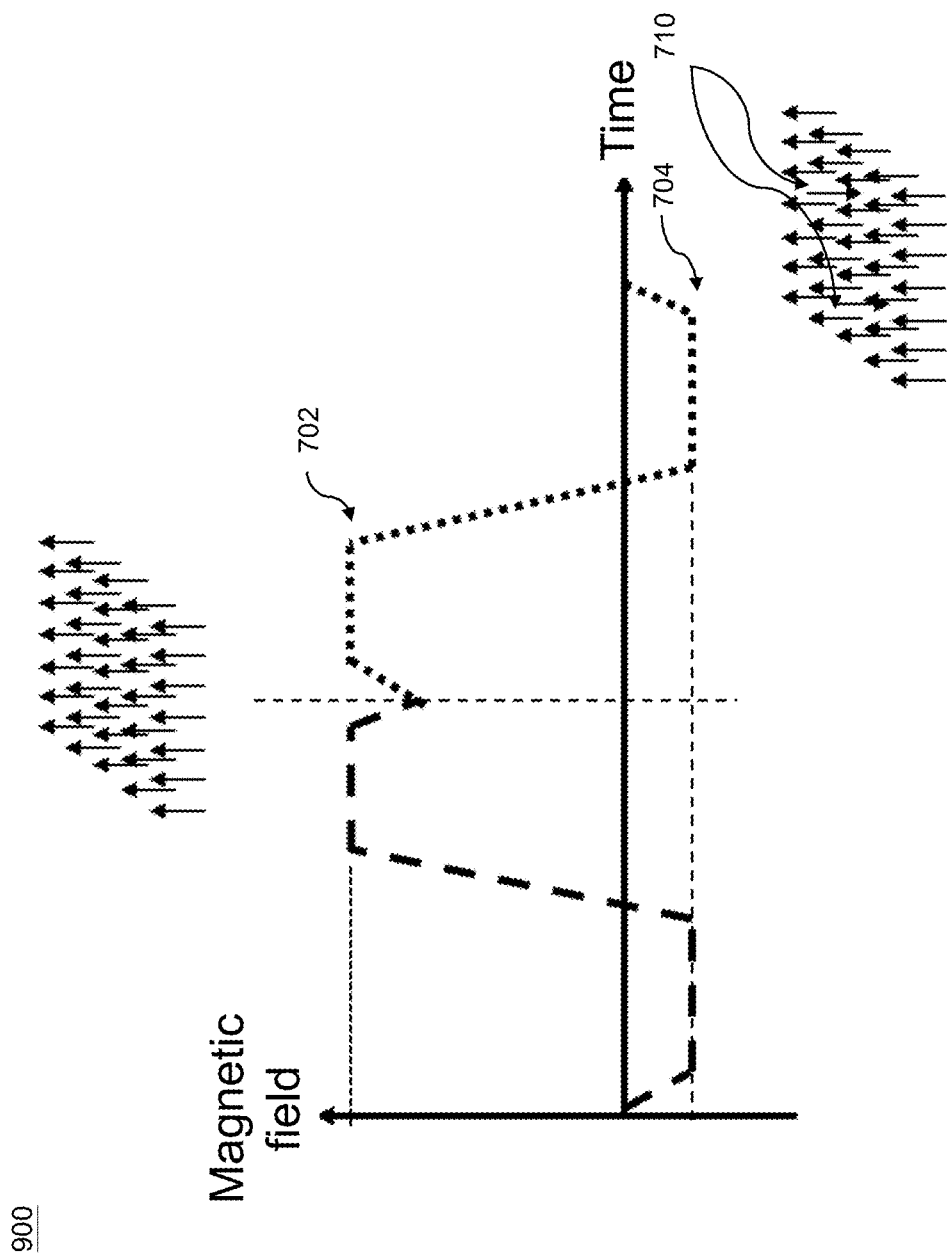
FIG. 9 illustrates a time dependent magnetic field experienced by a wafer moved through the system of FIG. 6 following the path indicated in FIG. 8, according to various embodiments.

FIG. 9 illustrates a time dependent magnetic field 900 experienced by wafer 602 as it is moved through the system of FIG. 6 along paths 802 and 804 of FIG. 8, according to an embodiment. As indicated in FIG. 8, wafer 602 first enters the system along path 802 moving first through the second magnet 608, which subjects wafer 602 to the second magnetic field having strength 704 (i.e., wafer moving along path 802 goes in a first direction that is opposite of path 610 of FIG. 6). Continuing along path 802, wafer 602 passes through shielding material 606 and then passes into the first magnet 604. As such, wafer 602 is then subjected to the first magnetic field 702.

The curve in FIG. 9 extending from time=0 to the middle of the curve (i.e., indicated by the vertical dashed line in FIG. 9) represents the magnetic fields experienced by wafer 602 moving through the system along path 802. The dip in the curve indicated by the vertical dashed line in FIG. 9 corresponds to a point on wafer 602 that has moved outside of first magnet 604 and therefore experiences fringing fields of magnet 604 that have a magnitude that is less than the maximum magnetic field strength 702 of first magnet 604. As wafer 602 is moved back through the system along path 804 in FIG. 8, the magnetic field experienced by wafer 602 is shown as the remaining portion of the curve to the right of the vertical dashed line in FIG. 9. In this regard, wafer 602 re-enters first magnet 604 and thereby re-experiences the first magnetic field which has magnitude 702. Wafer 602 then re-enters shielding material 606 followed by entering the second magnet 608. As such, the magnetic field experienced by wafer 602 changes from magnitude 702 within first magnet 604 to magnitude 704 within second magnet 608.

As described above, the effect of exposure to the first magnetic field 702 of the first magnet 604 is to polarize MRAM bits as indicated by the uniform alignment of arrows above the curve in FIG. 9. Upon further passing through the first magnet 604, wafer 602 is exposed to second magnetic field 704 applied by the second magnet 608, which leaves most bits unaltered. Some of the bits (e.g., 710) in wafer 602 may, however, be altered by second magnetic field 704 as shown by the non-uniform polarization indicated by the arrows below the curve to the right of FIG. 9. As describe above, any bits that are reversed by second magnetic field 704 may correspond to malfunctioning or damaged bits. Further testing using chip probing (e.g., with probe 203 of FIG. 2) may be performed to characterize potentially malfunctioning bits. Alternatively, malfunctioning bits may be detected by reading MRAM data values after exposure to the second magnetic field strength 704.

Figure 10:
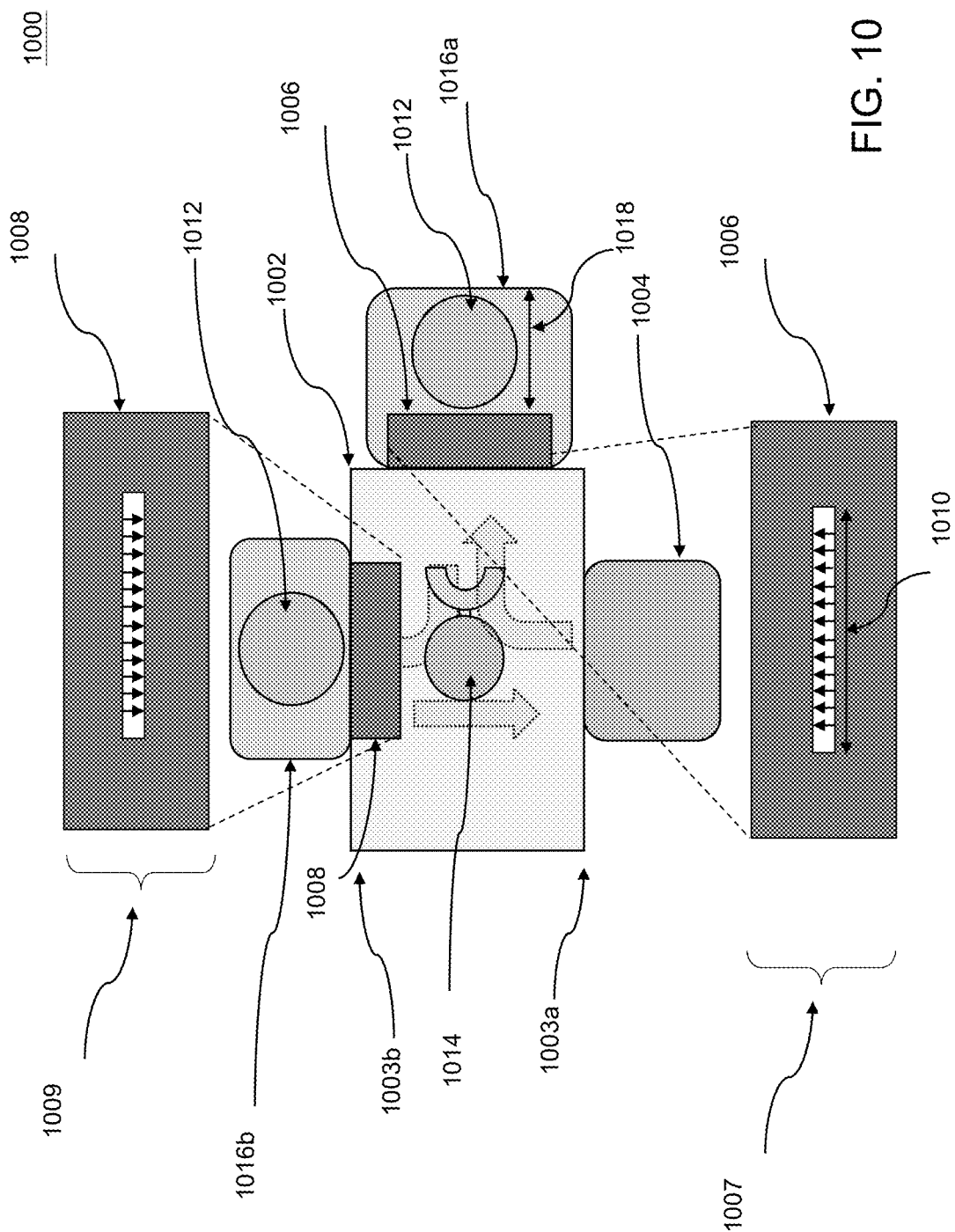
FIG. 10 illustrates a top-down view of a first system configured to expose large areas of a wafer to magnetic fields, according to various embodiments.

FIG. 10 illustrates a top-down view of a first system 1000 configured to expose large areas of a wafer 1012 to magnetic fields, according to an embodiment. System 1000 includes an Equipment Front End Module (EFEM) 1002 having a front side 1003a and a back side 1003b. System 1000 includes a load port 1004 which may initially provide wafer 1012 to system 1000. System 1000 includes a first magnet 1006, which generates a first magnetic field, and a second magnet 1008, which generates a second magnetic field. A cross-sectional view 1007 of magnet 1006 is shown in the lower portion of FIG. 10. A cross-sectional view 1009 of magnet 1008 is shown in the upper portion of FIG. 10. In further embodiments, the first magnet 1006 and the second magnet 1008 may be placed in various other locations relative to the EFEM. For example, the first magnet 1006 and the second magnet 1008 may be located inside or outside the EFEM, to the right, to the left, to the back, or to the front of the EFEM. In further embodiments, the first magnet 1006 and the second magnet 1008 may be located in an enclosure (not shown) that is separate from the EFEM.

As shown in cross-sectional views 1007 and 1009, magnets 1006 and 1008 include openings having widths sufficiently large to allow wafer 1012 to pass through magnets 1006 and 1008. In this regard, width 1010 of openings in magnets 1006 and 1008 may be larger than a diameter of wafer 1012. For example, wafer 1012 may have a diameter 1018 of 300 mm and width 1010 of openings in magnets 1006 and 1008 may be larger than 300 mm. In other embodiments, wafer 1012 may include other diameters and magnets 1006 and 1008 may have corresponding opening widths to allow wafer 1012 to pass through openings in magnets 1006 and 1008. The various embodiments disclosed herein are not intended to be limited to any particular wafer size or corresponding magnet opening size, and other embodiments may have other opening sizes to accommodate wafers having various sizes.

System 1000 may include a robot 1014 that may be configured to retrieve wafer 1012 from load port 1004 and to move wafer 1012 through first magnet 1006. As shown, system 1000 may include a first cover 1016a that may be configured to protect wafer 1012 after wafer 1012 passes through first magnet 1006. Robot 1014 may be further configured to retrieve wafer 1012 from cover 1016a and to pass wafer 1012 back through magnet 1006 that may apply a first magnetic field with a first orientation and first magnitude. Robot 1014 may then pass wafer 1012 through magnet 1008 that applies a magnetic field with an opposite orientation and different magnitude than applied by first magnet 1006. System 1000 may further include a second cover 1016b that may be configured to protect wafer 1012 after wafer 1012 passes through second magnet 1008. Robot 1014 may then retrieve wafer 1012 from second cover 1016*b* and once-again pass wafer back through second magnet 1008. Robot 1014 may then deposit wafer 1012 back into load port 1004 for further processing. First cover 1016*a* and second cover 1016*b* may be made of a material that shields magnetic fields. For example, first cover 1016*a* and second cover 1016*b* may be made of polymethylmethacrylate (PMMA) or mu-metal. In other embodiments, various other suitable magnetic shielding materials may be used for first cover 1016*a* and second cover 1016*b*.

As with other embodiments described above, first magnet 1006 and second magnet 1008 may have first and second magnetic fields having first and second directions/orientations, respectively. Further, first magnet 1006 may generate a magnetic field sufficiently strong to polarize MRAM bits on wafer 1012. Second magnet 1008 may have a second magnetic field oriented in a different (e.g., opposite) direction to that of the direction of the first magnetic field of first magnet 1006. Further, second magnet 1008 may have a magnitude less than a design threshold for reversal of MRAM bits. As such, all MRAM bits that may be polarized by the first magnet 1006 may not be altered by second magnet 1008. Any bits that may be altered by second magnet 1008 (e.g., have reversed polarity) may correspond to damaged or malfunctioning bits. After being processed by system 1000, further testing of wafer 1012 using chip probing (e.g., with chip probe 203 of FIG. 2) may be performed to characterize potentially malfunctioning bits. Alternatively, malfunctioning bits may be detected by reading MRAM data values after exposure to the second magnetic generated by second magnet 1008.

Figure 11:
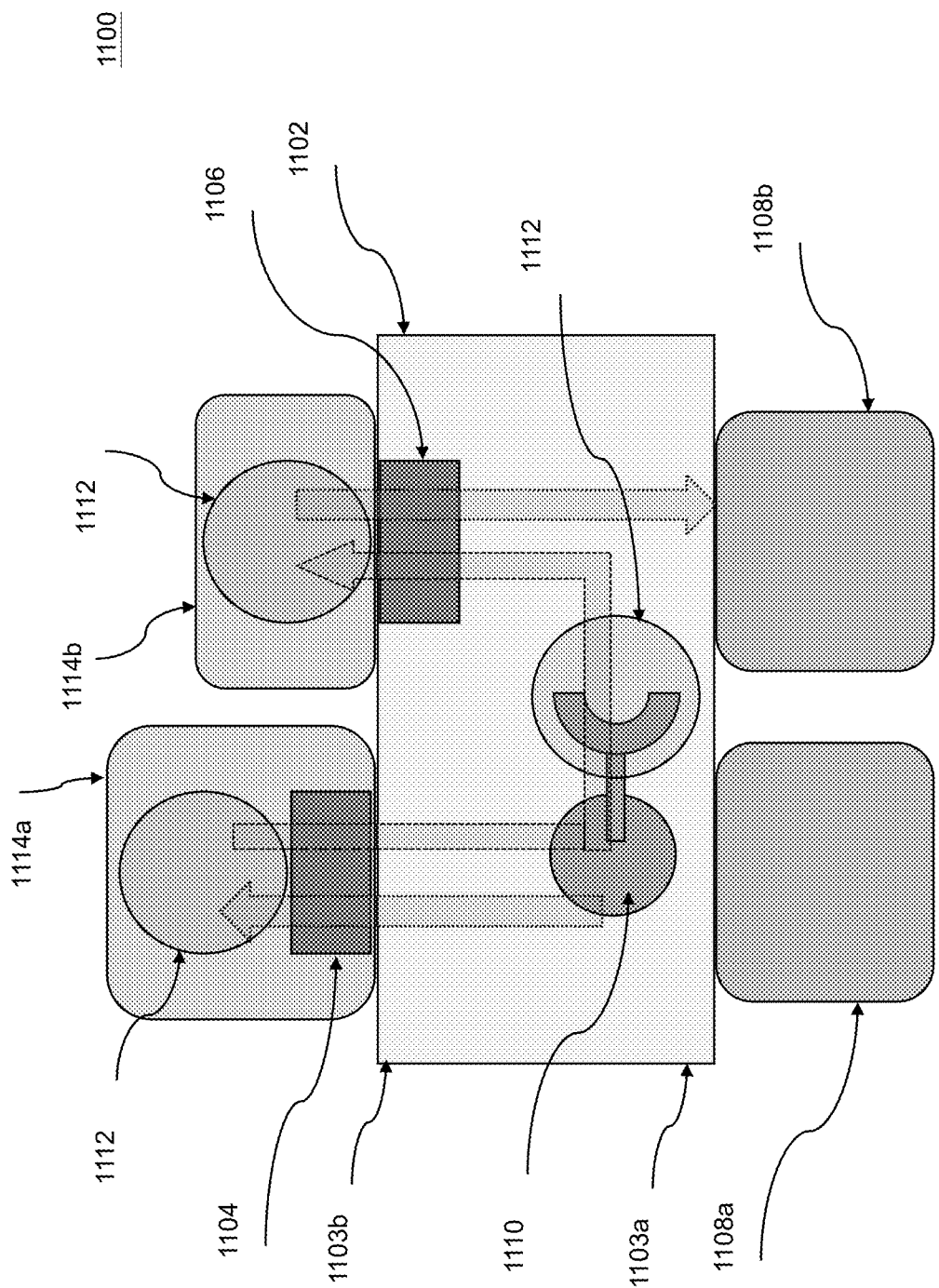
FIG. 11 illustrates a top-down view of a second system configured to expose large areas of a wafer to magnetic fields, according to an embodiment.

FIG. 11 illustrates a top-down view of a second system 1100 configured to expose large areas of a wafer 1112 to magnetic fields, according to another embodiment. System 1100 includes an EFEM 1102 having a front side 1103*a* and a back side 1103*b*. System 1100 may further include a first magnet 1104 and a second magnet 1106. First magnet 1104 and second magnet 1106 may be configured as describe above with reference to FIG. 10. In this regard, first magnet 1104 and second magnet 1106 may have openings (not shown) that are sufficiently large to allow wafer 1112 to pass through first magnet 1104 and second magnet 1106. For example, if wafer 1112 has a diameter of 300 mm, the first magnet 1104 and the second magnet 1106 may have openings that are larger than 300 mm to thereby allow wafer 1112 to pass through magnets 1104 and 1106. The various embodiments disclosed herein are not intended to be limited to any particular wafer size or corresponding magnet size, and other embodiments may have other magnet sizes to accommodate wafers having various sizes.

System 1100 may include a first load port 1108*a* and a second load port 1108*b*. First load port 1108*a* may be configured to initially provide wafer 1112 to system 1100 prior to processing and second load port 1108*b* may be configured to receive wafer 1112 after processing by system 1100. System 1100 may include a robot 1110 that is configured to receive wafer 1112 from load port 1108*a*, to pass wafer 1112 sequentially through the first magnet 1104 and the second magnet 1106, and to pass the wafer 1112 to the second load port 1108*b*. System 1100 may further include a first cover 1114*a* and a second cover 1114*b*. The first cover 1114*a* may be configured to protect wafer 1112 after wafer 1112 has passed through the first magnet 1104. The second cover 1114*b* may similarly be configured to protect wafer 1112 after wafer 1112 has passed through the second magnet 1106. Covers 1114*a* and 1114*b* may include materials that shield magnetic fields.

As with other embodiments described above, the first magnet 1104 may have a first magnetic field that is sufficiently strong to polarize MRAM bits on wafer 1112. The second magnet 1106 may have a weaker magnetic field that is less than a design threshold for reversal MRAM bits. Further, the second magnetic field of the second magnet 1106 may be oriented at a different (e.g., opposite) direction to that of the first magnetic field of the first magnet 1104. Properly functioning MRAM bits will be polarized by the first magnetic field generated by the first magnet 1104 but will be substantially unaffected by the second magnetic field generated by the second magnet 1106. Any bits that are altered (e.g., reversed) by the second magnet 1106 may be considered to be damaged and/or malfunctioning. After being processed by system 1100, further testing of wafer 1112 using chip probing (e.g., with chip probe 203 of FIG. 2) may be performed to characterize potentially malfunctioning bits. Alternatively, malfunctioning bits may be detected by reading MRAM data values after exposure to the second magnetic field generated by the second magnet 1106.

Figure 12:
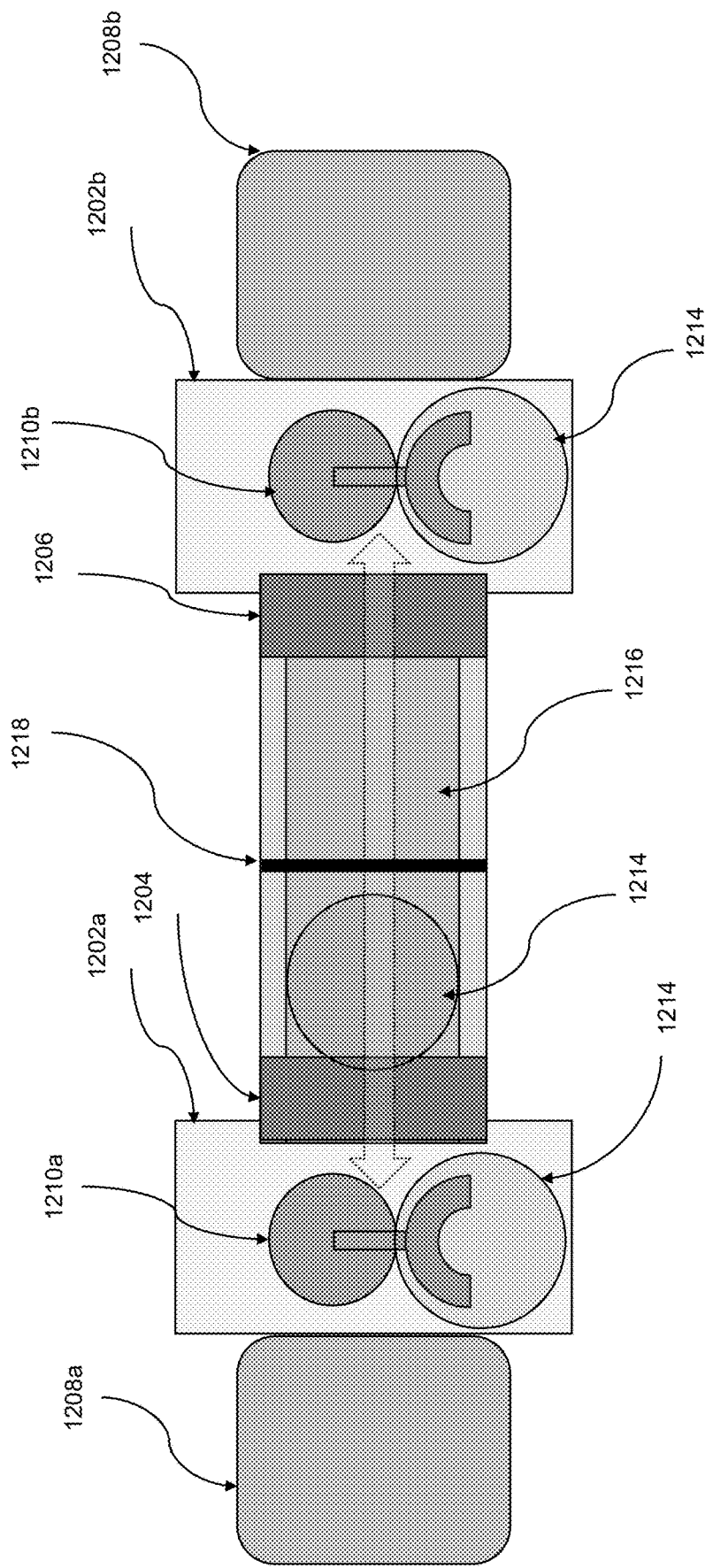
FIG. 12 illustrates a top-down view of a third system configured to expose large areas of a wafer to magnetic fields, according to various embodiments.

FIG. 12 illustrates a top-down view of a third embodiment system 1200 configured to expose large areas of a wafer 1214 to magnetic fields, according to an embodiment. System 1200 includes a first EFEM 1202*a* and a second EFEM 1202*b*. System 1200 further includes a first magnet 1204 and a second magnet 1206. The first magnet 1204 and the second magnet 1206 may be placed anywhere relative to the conveyer 1216 in various embodiments. As described above, the first magnet 1204 and the second 1206 may each include openings (not shown) that are sufficiently large to allow wafer 1214 to pass through the first magnet 1204 and the second magnet 1206. For example, in instances in which a wafer 1214 has a diameter of 300 mm, the first magnet 1204 and the second magnet 1206 may each have openings that are larger than 300 mm to thereby allow wafer 1214 to pass through the first magnet 1204 and the second magnet 1206. The various embodiments disclosed herein are not intended to be limited to any particular wafer size or corresponding magnet type and size, and other embodiments may have other magnet types and sizes to accommodate wafers having various sizes.

System 1200 may include a first load port 1208*a* and a second load port 1208*b*. The first load port 1208*a* may initially provide wafer 1214 to system 1200 prior to processing, and load port 1208*b* may receive wafers 1214 after processing. System 1200 may include a first robot 1210*a* and a second robot 1210*b*. First robot 1210*a* may be housed in first EFEM 1202*a* and may be configured to move wafers 1214 from first load port 1208*a* and into first magnet 1204. Second robot 1210*b* may be configured to receive wafers 1214 after the wafers 1214 have passed through the second magnet 1206 and to provide wafers 1214 to second load port 1208*b*. System 1200 may include a conveyer 1216 that may be configured to receive wafers 1214 from first magnet 1204 and to provide wafers 1214 to the second magnet 1206. System 1200 may further include a magnetic shielding material 1218 that prevents magnetic fields from the respective first magnet 1204 and second magnet 1206 from appreciably overlapping.

As with other embodiments described above, the first magnet 1204 may have a first magnetic field that is sufficiently strong to polarize MRAM bits on wafer 1214. The second magnet 1206 may have a weaker magnetic field that is less than a design threshold for reversal MRAM bits. Further, the second magnetic field of the second magnet 1206 may be oriented in a different (e.g., opposite) direction to that of the first magnetic field of the first magnet 1204.

Properly functioning MRAM bits will be polarized by the first magnetic field generated by the first magnet 1204 but may be substantially unaffected by the second magnetic field generated by the second magnet 1206. Any bits that are altered (e.g., reversed) by the second magnetic field applied by the second magnet 1206 may be considered to be damaged and/or malfunctioning. After being processed by system 1200, further testing of wafer 1214 using chip probing (e.g., with chip probe 203 of FIG. 2) may be performed to characterize potentially malfunctioning bits. Alternatively, malfunctioning bits may be detected by reading MRAM data values after exposure to the second magnetic generated by the second magnet 1206.

Figure 13:
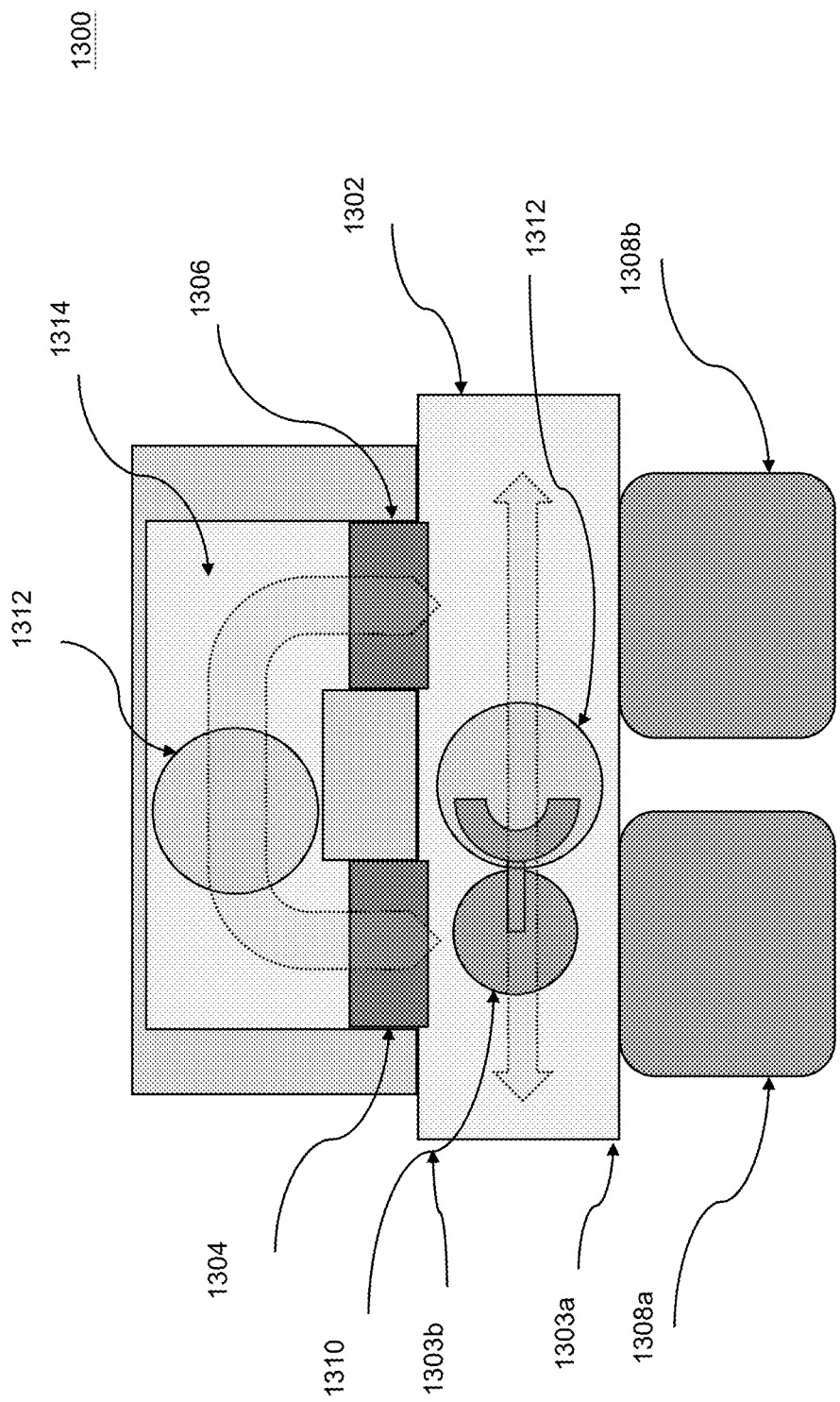
FIG. 13 illustrates a top-down view of a fourth system configured to expose large areas of a wafer to magnetic fields, according to various embodiments.

FIG. 13 illustrates a top-down view of a fourth embodiment system 1300 configured to expose large areas of a wafer 1312 to magnetic fields, according to an embodiment. System 1300 includes a EFEM 1302 having a front side 1303*a* and a back side 1303*b*. System 1300 further includes a first magnet 1304 and a second magnet 1306. The first magnet 1304 and the second magnet 1306 may be placed anywhere relative to the conveyer 1314 in various embodiments. System 1300 further incudes a first load port 1308*a* and a second load port 1308*b*. First load port 1308*a* may be configured to initially provide wafer 1312 to system 1300, while the second load port 1308*b* may be configured to receive wafers 1312 after the wafers 1312 have been processed by system 1300.

System 1300 further includes a robot 1310 that may be configured to retrieve a wafer 1312 from first load port 1308*a* and to pass the wafer 1312 through the first magnet 1304. Robot 1310 may be further configured to move laterally (i.e., in a left to right direction in FIG. 13) so that the robot 1310 may move from a first lateral position near the first magnet 1304 to a second lateral position near the second magnet 1306. In this way, when in the second lateral position, the robot 1310 may receive the wafer 1312 from the second magnet 1306 and to provide the wafer 1312 to second load port 1308*b*. System 1300 further includes a conveyer 1314 that may be configured to transport the wafer 1312 from the first magnet 1304 to the second magnet 1306.

As with other embodiments described above, the first magnet 1304 may have a first magnetic field that is sufficiently strong to polarize MRAM bits on wafer 1312. The second magnet 1306 may have a weaker second magnetic field that is less than a design threshold for reversal MRAM bits. Further, the second magnetic field of the second magnet 1306 may be oriented in a different (e.g., opposite) direction to that of the first magnetic field of the first magnet 1304. Properly functioning MRAM bits will be polarized by the first magnetic field generated by the first magnet 1304 but will be substantially unaffected by the second magnetic field generated by the second magnet 1306. Any bits that are altered (e.g., reversed) by the second magnetic field applied by the second magnet 1306 may be considered to be potentially damaged and/or malfunctioning. After being processed by system 1300, further testing of wafers 1312 using chip probing (e.g., with chip probe 203 of FIG. 2) may be performed to characterize potentially malfunctioning bits. Alternatively, malfunctioning bits may be detected by reading MRAM data values after exposure to the second magnetic generated by magnet 1306.

Figure 14:
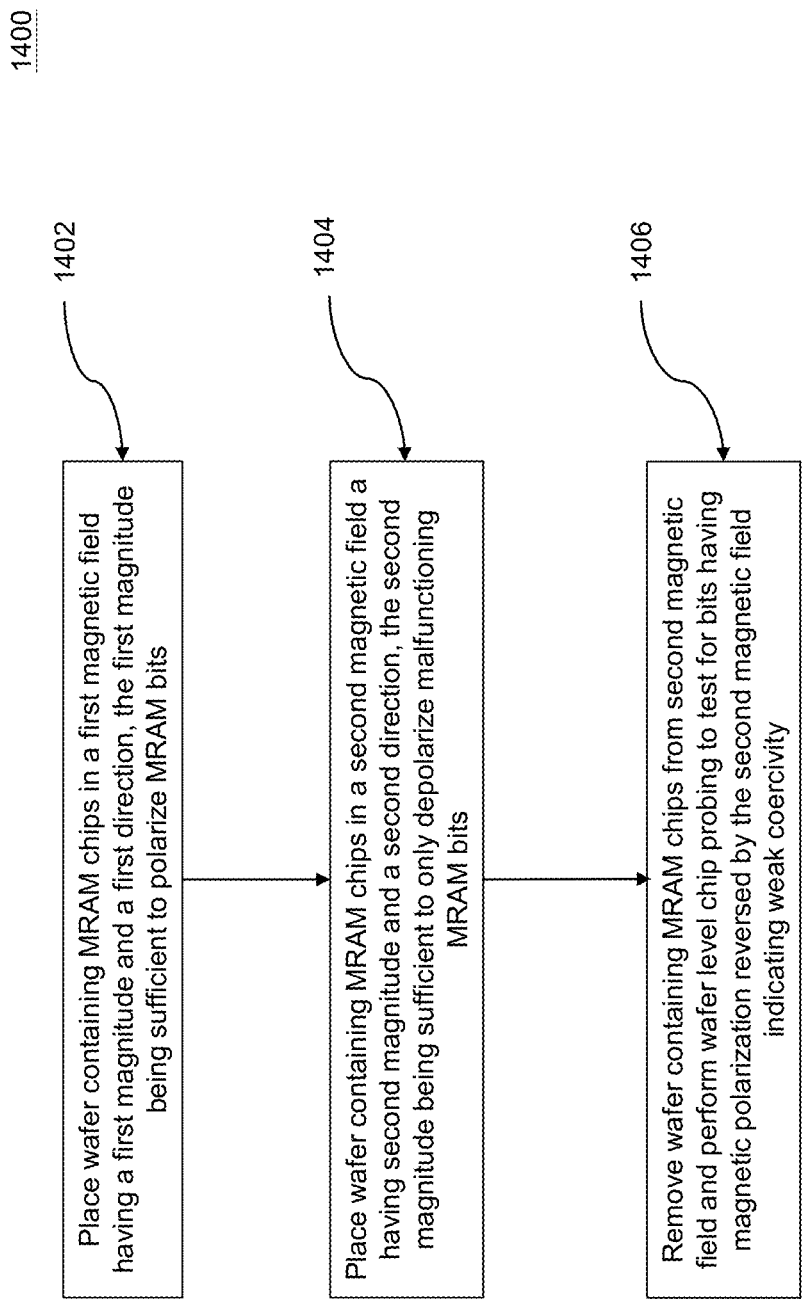
FIG. 14 is a flow chart illustrating stages of a method to test MRAM chips to detect malfunctioning bits, according to various embodiments.

FIG. 14 is a flow chart 1400 illustrating stages of a method to test MRAM chips to detect potentially malfunctioning bits, according to an embodiment. In a first stage 1402, the method includes placing a wafer containing MRAM chips in a first magnetic field having a first magnitude and direction. The first magnetic field is chosen to have a first magnitude sufficient to polarize MRAM bits. As such, the magnitude of the first magnetic field is chosen to be stronger than a design threshold required to polarize the free magnetic layer of MTJ devices in a system of MRAM devices. The first magnetic field is chosen to have a large area over which the magnetic field strength has an approximately uniform direction and field strength. In this way, a large area of a wafer containing MRAM chips may be exposed to a uniform first magnetic field such that MRAM bits within the uniform area of the first magnetic field become approximately uniformly polarized.

In a second stage 1404, the method includes placing the wafer into a second magnetic field after the wafer was been placed in the first magnetic field. The second magnetic field may be chosen to have a different (e.g., opposite) direction to that of the first magnetic field. The second magnetic field is chosen to have a large area over which the magnetic field strength has an approximately uniform direction and field strength. In this way, a large area of a wafer containing MRAM chips may be exposed to a uniform second magnetic field. Further, the second magnetic field may be chosen to have a magnitude that is less than the design threshold for reversal of the magnetic polarization of the MRAM bits. As such, properly functioning MRAM bits that were polarized by the first magnetic field should be substantially unaffected by the second magnetic field. Some MRAM bits, however may have a coercivity that is less than a design coercivity and, as such, may be altered (e.g., reversed) by the second magnetic field.

In a third stage 1406, the method includes removing the wafer from the second magnetic field and testing the wafer for malfunctioning MRAM bits. Testing of the wafer may be performed using chip probing to characterize potentially malfunctioning bits. For example, chip probe 203 (e.g., see FIG. 2 and related description) may be configured to contact test pads disposed on wafer 10 for measuring voltage, current, resistances, and other characteristics of the dies. The test pads may be disposed on dies 11 or scribe lines between dies 11.

Alternatively, malfunctioning bits may be detected by reading MRAM data values after exposure to the second magnetic generated by magnet. In this regard, application of the first magnetic field may act to program all of the data bits to have a first state (e.g., a "1" state). Application of the second magnetic field has the effect of only altering (e.g., change a "1" state to a "0" state) malfunctioning bits. Thus, any bits detected to be in the second state (e.g., the "0") may be identified as potentially malfunctioning bits. The state of various MRAM bits may be detected using MRAM circuitry (e.g., see FIG. 1) that is configured to read data values from MRAM cells.

The above-described embodiments are advantageous in that they provide greatly accelerated testing procedures by allowing large portions of a wafer (e.g., an entire wafer) to be exposed to uniform magnetic fields at a time. In contrast, with a die-by-die procedure (e.g., see FIGS. 1 and 2 and related description), the time required to align MRAM bits with a first field and then to apply the second field takes approximately 3 second per die. A wafer having for example, 80 dies, therefore, requires approximately 250 seconds. The die-by-die chip probing for weak bits takes approximately 5 second per die leading to a total time of approximately 400 seconds for a wafer having 80 dies. Thus, a die-by-die procedure, as described above with reference to FIGS. 1 and 2 leads to a throughput of less than 6 wafers per hour. According to disclosed systems and methods, the application of magnetic fields to an entire wafer takes less than 25 seconds per wafer, leading to a throughput (for the magnetic field application stage) of greater than 100 wafers per hour. In addition, the system magnet module may be integrated with either Prober or EFEM for cost savings.

The first magnets and the second magnets in the various embodiments described above may be permanent magnets or may be electromagnets. Permanent magnets may be cylindrical or cylindrical with a convex or trapezoidal column shape. Further, such magnets may cover a larger portion of a single wafer or may be sufficiently large to cover an entire wafer with a uniform magnetic field. Alternatively, one or both of the magnets may be bar magnets that may be scanned across a wafer, or the wafer may be moved relative to the bar magnets. The strength of an applied field may be changed in several ways. For a permanent magnet, the strength of a field at the surface of a wafer may be controlled by adjusting a distance between the wafer and the magnet. For example, a magnetic field strength may be increased by decreasing the distance between the wafer and the magnet and vice versa. For an electromagnet, the strength of the magnetic field may be determined by the magnitude of electric currents supplied to the electromagnet, with stronger magnetic fields being generated by larger currents and vice versa.

Various embodiments include magnetic shielding material placed between the two magnets. The use of such magnetic shielding material allows the two magnets to be placed closer together than would otherwise be possible, thereby allowing compact designs. Further, by configuring the two magnets to be closely spaced allows both magnets to be configured as part of a single system thereby reducing tool costs.

With reference to FIGS. 2-13, various embodiment systems 1000, 1100, 1200, 1300 may be provided, wherein the system may include: a first magnet 604, 1006, 1104, 1204, 1304 may be configured to generate a first magnetic field having a first direction and a first magnitude, the first magnet 604, 1006, 1104, 1204, 1304 having a first size that is sufficiently large such that a semiconductor wafer 602, 1012, 1112, 1214, 1312 may be moved relative to the first magnet 604, 1006, 1104, 1204, 1304 to thereby expose the semiconductor wafer 602, 1012, 1112, 1214, 1312 to the first magnetic field; a second magnet 608, 1008, 1106, 1206, 1306 may be configured to generate a second magnetic field having a second direction and a second magnitude, the second magnet 608, 1008, 1106, 1206, 1306 having a second size that is sufficiently large such that the semiconductor wafer 602, 1012, 1112, 1214, 1312 may be moved relative to the second magnet 608, 1008, 1106, 1206, 1306 to thereby expose the semiconductor wafer 602, 1012, 1112, 1214, 1312 to the second magnetic field; and a mechanical device 1014, 1110, 1210a, 1210b, 1216, 1310 may be configured to move the semiconductor wafer 602, 1012, 1112, 1214, 1312 relative to the first magnet 604, 1006, 1104, 1204, 1304 exposing the semiconductor wafer 602, 1012, 1112, 1214, 1312 to the first magnetic field and to move the semiconductor wafer 602, 1012, 1112, 1214, 1312 relative to the second magnet 608, 1008, 1106, 1206, 1306 exposing the semiconductor wafer 602, 1012, 1112, 1214, 1312 to the second magnetic field, wherein the first magnet 604, 1006, 1104, 1204, 1304 may be configured to generate the first magnitude of the first magnetic field to be greater than a design threshold so that MRAM bits 710 on the semiconductor wafer 602, 1012, 1112, 1214, 1312 may be polarized by the first magnetic field.

In one embodiment, the second magnet 608, 1008, 1106, 1206, 1306 may be configured to generate the second magnitude of the second magnetic field to be less than the design threshold so that properly functioning MRAM bits on the semiconductor wafer 602, 1012, 1112, 1214, 1312 do not suffer depolarization or polarization reversal due to exposure to the second magnetic field. In one embodiment, the first magnet 604, 1006, 1104, 1204, 1304 and the second magnet 608, 1008, 1106, 1206, 1306 may generate a first magnetic field and a second magnetic field, respectively, that are substantially uniform over an area corresponding to an area of the entire semiconductor wafer 602, 1012, 1112, 1214, 1312. In one embodiment, one or both of the first magnet 604, 1006, 1104, 1204, 1304 and the second magnet 608, 1008, 1106, 1206, 1306 may be permanent magnets, or one or both of the first magnet 604, 1006, 1104, 1204, 1304 and the second magnet 608, 1008, 1106, 1206, 1306 may be electromagnets. In one embodiment, the mechanical device 1014, 1110, 1210a, 1210b, 1310 may be a robot. In one embodiment, the mechanical device may be a conveyor 1216. In one embodiment, the first magnet 604, 1006, 1104, 1204, 1304 and the second magnet 608, 1008, 1106, 1206, 1306 and the mechanical device 1014, 1110, 1210a, 1210b, 1310 may be configured as a part of an equipment front end module (EFEM). In one embodiment, the system 1000, 1100, 1200, 1300 may also include a load port 1004, 1108a, 1208a, 1308a that provides the semiconductor wafer 602, 1012, 1112, 1214, 1312 to the system 1000, 1100, 1200, 1300. In one embodiment, the system 1000, 1100, 1200, 1300 may also include a controller 204 configured to control the mechanical device 1014, 1110, 1210a, 1210b, 1310 to perform operations including: receiving the semiconductor wafer 602, 1012, 1112, 1214, 1312 from the load port 1004, 1108a, 1208a, 1308a; moving the semiconductor wafer 602, 1012, 1112, 1214, 1312 relative to the first magnet 604, 1006, 1104, 1204, 1304 to thereby expose the semiconductor wafer 602, 1012, 1112, 1214, 1312 to the first magnetic field; moving the semiconductor wafer 602, 1012, 1112, 1214, 1312 relative to the second magnet 608, 1008, 1106, 1206, 1306 to thereby expose the semiconductor wafer 602, 1012, 1112, 1214, 1312 to the second magnetic field; and moving the semiconductor wafer 602, 1012, 1112, 1214, 1312 back to the load port 1004, 1108b, 1208b, 1308b. In one embodiment, the system 1000, 1100, 1200, 1300 may also include a first cover 1016a, 1114a, including a magnetically shielding material; and a second cover 1016b, 1114b including a magnetically shielding material, wherein the first cover 1016a, 1114a may be configured to protect the semiconductor wafer 602, 1012, 1112, 1214, 1312 after the semiconductor wafer 602, 1012, 1112, 1214, 1312 has passed through the first magnet 604, 1006, 1104, 1204, 1304, and wherein the second cover 1016b, 1114b may be configured to protect the semiconductor wafer 602, 1012, 1112, 1214, 1312 after the semiconductor wafer 602, 1012, 1112, 1214, 1312 has passed through the second magnet 608, 1008, 1106, 1206, 1306. In one embodiment, the system 1000, 1100, 1200, 1300 may also include a second load port 1108b, 1208b, 1308b that may be configured to receive the semiconductor wafer 602, 1012, 1112, 1214, 1312 after the semiconductor wafer 602, 1012, 1112, 1214, 1312 has passed through the first magnetic field and the second magnetic field. In one embodiment, the first magnet 604, 1006, 1104, 1204, 1304 and the second magnet 608, 1008, 1106, 1206, 1306 may be configured as a part of an EFEM in one of the following configurations: with the first magnet 604, 1006, 1104, 1204, 1304 and the second magnet 608, 1008, 1106, 1206, 1306 on adjacent sides of the EFEM; with the first magnet 604, 1006, 1104, 1204, 1304 and the second magnet 608, 1008, 1106, 1206, 1306 on opposite sides of the EFEM; and with the first magnet 604, 1006, 1104, 1204, 1304 and the second magnet 608, 1008, 1106, 1206, 1306 on a common side of the EFEM. In one embodiment, the system 1000, 1100, 1200, 1300 may also include a chip probe 203 configured to measure one or more of voltage, current, and resistance of MRAM devices to determine malfunctioning MRAM bits 710 having a magnetic polarization that were reversed by application of the second magnetic field. In one embodiment, the system 1000, 1100, 1200, 1300 may also include magnetic shielding material 606, 1218 configured to prevent overlap of the first magnetic field and the second magnetic field.

With reference to FIG. 14, an embodiment method may be provided, wherein the method may include the operations of: placing the wafer 602, 1012, 1112, 1214, 1312 in a first magnetic field that has a first magnetic field direction and a first magnetic field magnitude, the first magnetic field magnitude being greater than a design threshold so that MRAM bits on the wafer 602, 1012, 1112, 1214, 1312 are polarized by the first magnetic field; placing the wafer 602, 1012, 1112, 1214, 1312 in a second magnetic field that has a second magnetic field direction and a second magnetic field magnitude, the second magnetic field magnitude being less than the design threshold so that properly functioning MRAM bits 710 on the wafer do not suffer depolarization or polarization reversal due to exposure to the second magnetic field; and determining the presence of malfunctioning MRAM bits 710 by determining that such malfunctioning MRAM bits have a magnetic polarization that was reversed due to exposure to the second magnetic field.

In one embodiment, the method may also include the operation of generating the first magnetic field and the second magnetic field such that the first magnetic field direction and the second magnetic field direction and the first magnetic field magnitude and the second magnetic field magnitude are substantially uniform over an area equivalent to or larger than an area of the wafer 602, 1012, 1112, 1214, 1312. In one embodiment, the method may also include the operation of determining the presence of malfunctioning MRAM bits 710 further comprises using a chip probe to read one or more of voltage, current, and resistance of MRAM devices to determine malfunctioning MRAM bits having a polarization that was reversed by application of the second magnetic field. In one embodiment, determining the presence of malfunctioning MRAM bits 710 may include: programming a plurality of MRAM bits 710 to have a first state due to exposure to the first magnetic field; reading MRAM data values after the wafer 602, 1012, 1112, 1214, 1312 has been exposed to the second magnetic field to determine a presence of MRAM bits having a second state that is different from the first state, the second state resulting from reversal of MRAM bit magnetic polarization due to exposure to the second magnetic field; and determining MRAM bits 710 having the second state to be malfunctioning MRAM bits.

The foregoing outlines features of several embodiments so that those skilled in the art may better understand the aspects of this disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of this disclosure, and that they may make various changes, substitutions, and alterations herein without departing from the spirit and scope of the present disclosure.

What is claimed is:

1. A system, comprising:
    a first magnet configured to generate a first magnetic field having a first direction and a first magnitude, the first magnet having a first size that is sufficiently large such that a semiconductor wafer may be moved relative to the first magnet to thereby expose the semiconductor wafer to the first magnetic field;
    a first cover including a first magnetically shielding material configured to protect the semiconductor wafer from magnetic fields generated by any magnet other than the first magnet after the semiconductor wafer has passed through the first magnet; and
    a second magnet configured to generate a second magnetic field having a second direction and a second magnitude, the second magnet having a second size that is sufficiently large such that the semiconductor wafer may be moved relative to the second magnet to thereby expose the semiconductor wafer to the second magnetic field;
    a second cover including a second magnetically shielding material configured to protect the semiconductor wafer from magnetic fields generated by any magnet other than the second magnet after the semiconductor wafer has passed through the second magnet; and
    a mechanical device configured to move the semiconductor wafer relative to the first magnet exposing the semiconductor wafer to the first magnetic field and to move the semiconductor wafer relative to the second magnet exposing the semiconductor wafer to the second magnetic field,
    wherein the first magnet is configured to generate the first magnitude of the first magnetic field to be greater than a design threshold so that magnetic random access memory (MRAM) bits on the semiconductor wafer are polarized by the first magnetic field.

2. The system of claim 1, wherein the second magnet is configured to generate the second magnitude of the second magnetic field to be less than the design threshold so that functioning MRAM bits on the semiconductor wafer do not suffer depolarization or polarization reversal due to exposure to the second magnetic field.

3. The system of claim 1, wherein the first magnet and the second magnet generate a first magnetic field and a second magnetic field, respectively, that are substantially uniform over an area corresponding to an area of the entire semiconductor wafer.

4. The system of claim 1, wherein:
    one or both of the first magnet and the second magnet are permanent magnets, or
    one or both of the first magnet and the second magnet are electromagnets.

5. The system of claim 1, wherein the mechanical device comprises a robot.

6. The system of claim 1, wherein the mechanical device comprises a conveyor.

7. The system of claim 1, wherein the first magnet and the second magnet and the mechanical device are configured as a part of an equipment front end module (EFEM).

8. The system of claim 7, wherein the system further comprises a load port that provides the semiconductor wafer to the system.

9. The system of claim 8, further comprising a controller configured to control the mechanical device to perform operations including:
    receiving the semiconductor wafer from the load port;

moving the semiconductor wafer relative to the first magnet to thereby expose the semiconductor wafer to the first magnetic field;

moving the semiconductor wafer relative to the second magnet to thereby expose the semiconductor wafer to the second magnetic field; and moving the semiconductor wafer back to the load port.

10. The system of claim 9,
wherein the first magnetically shielding material and the second magnetically shielding material comprise polymethylmethacrylate (PMMA) or mu-metal.

11. The system of claim 10, further comprising a second load port that is configured to receive the semiconductor wafer after the semiconductor wafer has passed through the first magnetic field and the second magnetic field.

12. The system of claim 1, wherein the first magnet and the second magnet are configured as a part of an equipment front end module (EFEM) in one of the following configurations:
with the first magnet and the second magnet on adjacent sides of the EFEM;
with the first magnet and the second magnet on opposite sides of the EFEM; and
with the first magnet and the second magnet on a common side of the EFEM.

13. The system of claim 1, further comprising a chip probe configured to measure one or more of voltage, current, and resistance of MRAM devices to determine malfunctioning MRAM bits having a magnetic polarization that were reversed by application of the second magnetic field.

14. The system of claim 1, further comprising magnetic shielding material configured to prevent overlap of the first magnetic field and the second magnetic field.

15. A method of characterizing a wafer containing dies having magnetic random access memory (MRAM) devices, the method comprising:
placing the wafer in a first magnetic field that has a first magnetic field direction and a first magnetic field magnitude, the first magnetic field generated by a first magnet and the first magnetic field magnitude being greater than a design threshold so that MRAM bits on the wafer are polarized by the first magnetic field;
magnetically shielding the wafer from magnetic fields generated by any magnet other than the first magnet;
placing the wafer in a second magnetic field that has a second magnetic field direction and a second magnetic field magnitude, the second magnetic field generated by a second magnet and the second magnetic field magnitude being less than the design threshold so that functioning MRAM bits on the wafer do not suffer depolarization or polarization reversal due to exposure to the second magnetic field;
magnetically shielding the wafer from magnetic fields generated by any magnet other than the second magnet; and
determining a presence of malfunctioning MRAM bits by determining that such malfunctioning MRAM bits have a magnetic polarization that was reversed due to exposure to the second magnetic field.

16. The method of claim 15, further comprising generating the first magnetic field and the second magnetic field such that the first magnetic field direction and the second magnetic field direction and the first magnetic field magnitude and the second magnetic field magnitude are substantially uniform over an area equivalent to or larger than an area of the wafer.

17. The method of claim 15, wherein determining the presence of malfunctioning MRAM bits further comprises using a chip probe to read one or more of voltage, current, and resistance of MRAM devices to determine malfunctioning MRAM bits having a polarization that was reversed by application of the second magnetic field.

18. The method of claim 15, wherein determining the presence of malfunctioning MRAM bits further comprises:
programming a plurality of MRAM bits to have a first state due to exposure to the first magnetic field;
reading MRAM data values after the wafer has been exposed to the second magnetic field to determine a presence of MRAM bits having a second state that is different from the first state, the second state resulting from reversal of MRAM bit magnetic polarization due to exposure to the second magnetic field; and
determining MRAM bits having the second state to be malfunctioning MRAM bits.

19. A processor implemented controller for an equipment front end module (EFEM) having a first magnet, a second magnet, a chip probe, and a mechanical device configured to move a wafer relative to the first magnet and the second magnet, the controller comprising a processor circuit configured to perform operations comprising:
controlling the mechanical device to place the wafer in a first magnetic field generated by the first magnet, a magnitude of the first magnetic field being greater than a design threshold so that magnetic random access memory (MRAM) bits on the wafer are polarized by the first magnetic field;
controlling the mechanical device to place the wafer within a first cover that includes a first magnetically shielding material configured to protect the wafer from magnetic fields other than the first magnetic field;
controlling the mechanical device to place the wafer in a second magnetic field generated by the second magnet, a magnitude of the second magnetic field being less than the design threshold so that functioning MRAM bits on the wafer do not suffer depolarization or polarization reversal due to exposure to the second magnetic field;
controlling the mechanical device to place the wafer within a second cover that includes a second magnetically shielding material configured to protect the wafer from magnetic fields other than the second magnetic field; and
controlling the chip probe to determine a presence of malfunctioning MRAM bits by determining that such malfunctioning MRAM bits have a magnetic polarization that was reversed due to exposure to the second magnetic field.

20. The processor implemented controller of claim 19, wherein the controller is further configured to perform operations comprising:
controlling the chip probe to measure one or more of voltage, current, and resistance of MRAM devices to thereby determine that such measured voltage, current, or resistance values correspond to MRAM bits having the magnetic polarization that was reversed due to exposure to the second magnetic field.

* * * * *